United States Patent
Abe

(10) Patent No.: US 8,195,716 B2
(45) Date of Patent: Jun. 5, 2012

(54) ELECTRONIC DICTIONARY APPARATUS AND RECORDING MEDIUM ON WHICH SEARCH CONTROL PROGRAM IS RECORDED

(75) Inventor: Takatoshi Abe, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 379 days.

(21) Appl. No.: 12/503,285

(22) Filed: Jul. 15, 2009

(65) Prior Publication Data

US 2009/0282007 A1 Nov. 12, 2009

Related U.S. Application Data

(63) Continuation of application No. 11/653,505, filed on Jan. 16, 2007, now abandoned.

(30) Foreign Application Priority Data

Jan. 17, 2006 (JP) .................................. 2006-009022

(51) Int. Cl.
*G06F 17/30* (2006.01)
(52) U.S. Cl. ............ 707/804; 707/805; 707/707; 704/8
(58) Field of Classification Search .................. None
See application file for complete search history.

(56) References Cited

U.S. PATENT DOCUMENTS

| | | | |
|---|---|---|---|
| 5,806,021 A | | 9/1998 | Chen et al. |
| 6,490,576 B1 | | 12/2002 | Nishiguchi |
| 6,961,464 B2 | | 11/2005 | Magoshi et al. |
| 7,664,628 B2 | * | 2/2010 | Kojo ................................. 704/4 |
| 7,761,452 B2 | * | 7/2010 | Chisaka ........................ 707/736 |
| 7,912,697 B2 | * | 3/2011 | Tomishige et al. ............... 704/8 |
| 7,930,166 B2 | * | 4/2011 | Ushioda et al. ................... 704/2 |
| 2004/0006460 A1 | | 1/2004 | Katayama et al. |
| 2004/0267537 A1 | | 12/2004 | Nakamura et al. |
| 2005/0228639 A1 | | 10/2005 | Abe et al. |
| 2006/0241933 A1 | | 10/2006 | Franz |
| 2009/0106018 A1 | * | 4/2009 | Liu .................................. 704/4 |

FOREIGN PATENT DOCUMENTS

CN          1577332 A          2/2005

(Continued)

OTHER PUBLICATIONS

Chinese Office Action dated Dec. 25, 2009 and English translation thereof issued in a counterpart Chinese Application No. 2007800032443.

(Continued)

*Primary Examiner* — Debbie Le
(74) *Attorney, Agent, or Firm* — Holtz, Holtz, Goodman & Chick, PC

(57) ABSTRACT

When an additional search key of an input unit is operated by the user, if a current display on a display screen of a display unit is a list display of respective example sentences, a user input for refining example sentences is received, and example sentences are refined in accordance therewith. When the additional search key is operated by the user, if the current display is a display of explanatory information on the vocabulary entry, the display screen of the display unit is split into two, and a search of the explanatory information is carried out on one split screen.

10 Claims, 15 Drawing Sheets

FOREIGN PATENT DOCUMENTS

| | | | |
|---|---|---|---|
| JP | 5-282365 | A | 10/1993 |
| JP | 6-44307 | A | 2/1994 |
| JP | 2001-134564 | A | 5/2001 |
| JP | 2003-132065 | A | 5/2003 |
| JP | 2005-25302 | A | 1/2005 |
| JP | 2005-070856 | A | 3/2005 |
| JP | 2005-070873 | A | 3/2005 |
| JP | 2005-202519 | A | 7/2005 |
| JP | 2005-316947 | A | 11/2005 |
| WO | WO 2004/059461 | A | 7/2004 |

OTHER PUBLICATIONS

Japanese Office Action dated Mar. 15, 2011 (and English translation thereof) in counterpart Japanese Application No. 2006-009022.
Notification Concerning Transmittal of International Search Report and Written Opinion of the International Searching Authority dated Jun. 5, 2007 for PCT/JP2007/050849, 12 sheets.
Taiwanese Office Action dated Jul. 14, 2010 (and English translation thereof) in counterpart Taiwanese Application No. 096101535.
Japanese Office Action dated Aug. 24, 2010 (and English translation thereof) in counterpart Japanese Application No. 2006-009022.

* cited by examiner

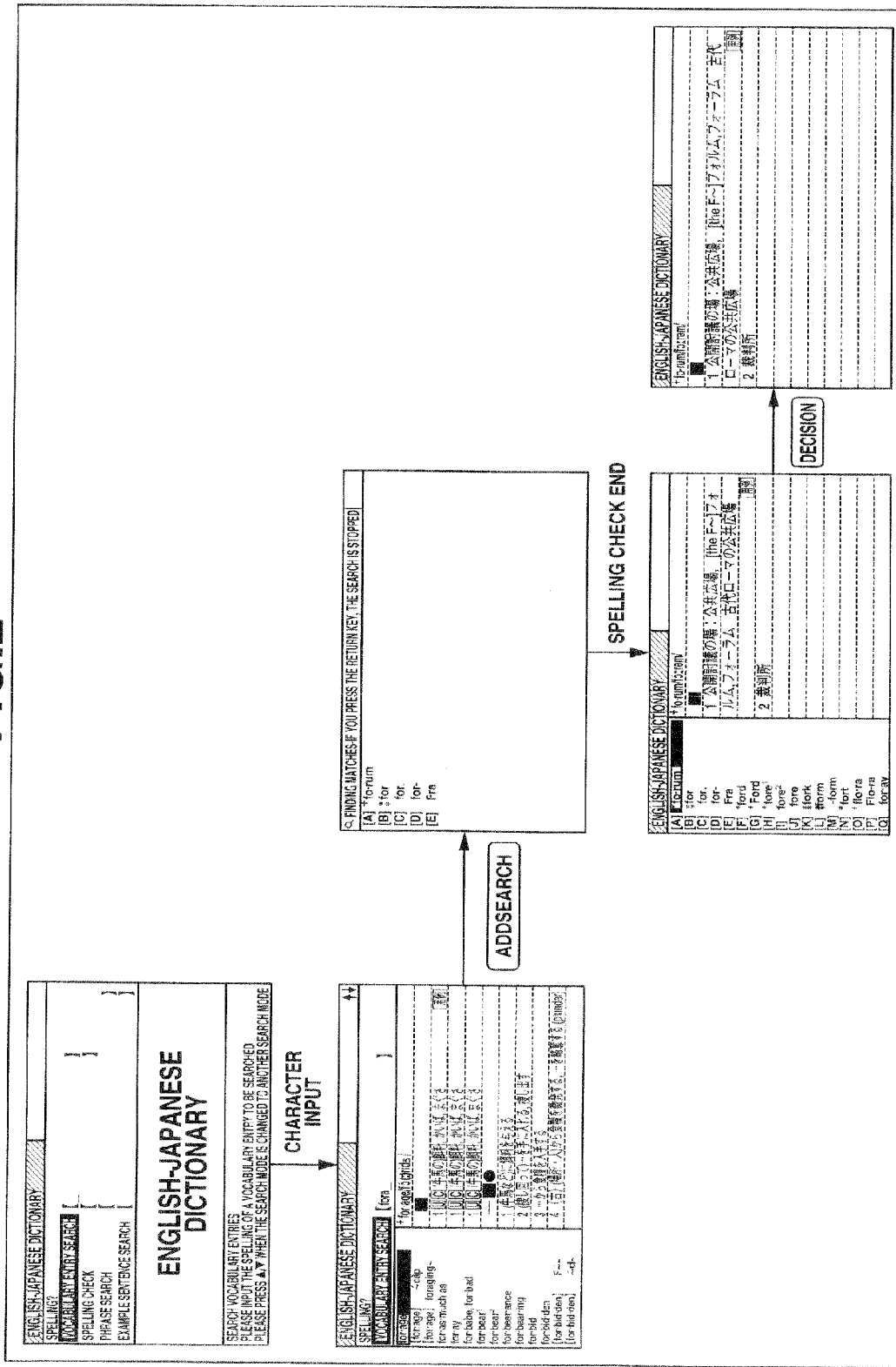

ELECTRONIC DICTIONARY APPARATUS AND RECORDING MEDIUM ON WHICH SEARCH CONTROL PROGRAM IS RECORDED

CROSS-REFERENCE TO RELATED APPLICATIONS

The present application is a Continuation Application of U.S. application Serial No. 11/653,505 filed Jan. 16, 2007, now abandoned, which is based upon and claims the benefit of priority from prior Japanese Patent Application No. 2006-009022, filed Jan. 17, 2006, the entire contents of which are incorporated herein by reference.

BACKGROUND OF THE INVENTION

1. Field of the Invention

The present invention relates to an electronic dictionary apparatus in which various dictionary databases converted into electronic data are stored, and which searches data information corresponding to an inputted search term to be displayed, and to a recording medium on which a search control program thereof is recorded.

2. Description of the Related Art

Conventionally, electronic dictionary apparatuses have been broadly generalized in which various dictionaries and wordbooks such as Japanese dictionaries, English-Japanese dictionaries, encyclopedias, and the like are converted into electronic data to be stored on storage media such as ROMs and the like, and which inputs various languages, thereof, and which searches translations, explanatory information, example sentences, and the like to be displayed.

Therefore, with respect to such electronic dictionary apparatuses, various functions for searching and displaying example sentences including inputted search characters have been proposed. For example, there is a function, as one of those example sentence search functions, in which an example sentence suitable for a word inputted as search characters is searched from a dictionary database to be displayed.

In a conventional electronic dictionary apparatus, when example sentences to be searched are generated in large numbers, it is very troublesome to select an example sentence for which a user really requires from the list of example sentences displayed in large numbers.

Further, when translations of or explanatory information on search characters are searched from a dictionary database, and are displayed, an attempt is made to further search new search characters relating to the displayed translations or explanatory information in many cases.

BRIEF SUMMARY OF THE INVENTION

The present invention has been achieved in consideration of such problems, and an object of the present invention is to provide an electronic dictionary apparatus by which it is possible to carry out additional search which must be desired by users, by operations easy to understand for users, and to provide a search control program thereof.

To solve the above-described problem, an electronic dictionary apparatus comprising: a plurality of dictionary databases of different types; one operating key determined in advance; a display; an example sentence search section configured to search example sentences including search characters inputted by user operations from at least one of the plurality of dictionary databases, and to list-display searched respective example sentences on the display; an explanatory information search section configured to for search vocabulary entries corresponding to the search characters inputted by the user operations from one of the plurality of dictionary databases, and to display explanatory information on the vocabulary entry on the display in accordance with an operation of selecting a vocabulary entry by a user; refinement section configured to receive a user input for refining example sentences when an operation by the one operating key determined in advance is carried out during the list display of the searched respective example sentences, and to refine the list-displayed example sentences in accordance with the user input; and split control section configured to split a display screen of the display into two when an operation by the one operating key determined in advance is carried out during the display of the explanatory information on the vocabulary entry, and to make the explanatory information search section operate again on one split screen.

In accordance with the present invention, when one operation key determined in advance is operated by a user, in a case in which a current display is a list display of searched respective example sentences, a user input for refining example sentences is received, and refining of the example sentences displayed in the list described above is carried out in accordance with the user input, and in a case of a display of explanatory information on vocabulary entries, because a display screen of a display is split into two, and an explanatory information search section is operated again in one split screen, it is possible to carry out an additional search which must be desired by a user among a plurality of types of additional searches by an operation easy to understand for the user which is an operation of the one operation key determined in advance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate a embodiment of the invention, and together with the general description given above and the detailed description of the embodiment given below, serve to explain the principles of the invention.

FIG. 2 is a diagram showing an example of transition of a display for explanation of operations in vocabulary entry search from an English-language dictionary in the portable device (electronic dictionary).

DETAILED DESCRIPTION OF THE INVENTION

Hereinafter, one embodiment of the present invention will be described with reference to the drawings.

Figure 1A:
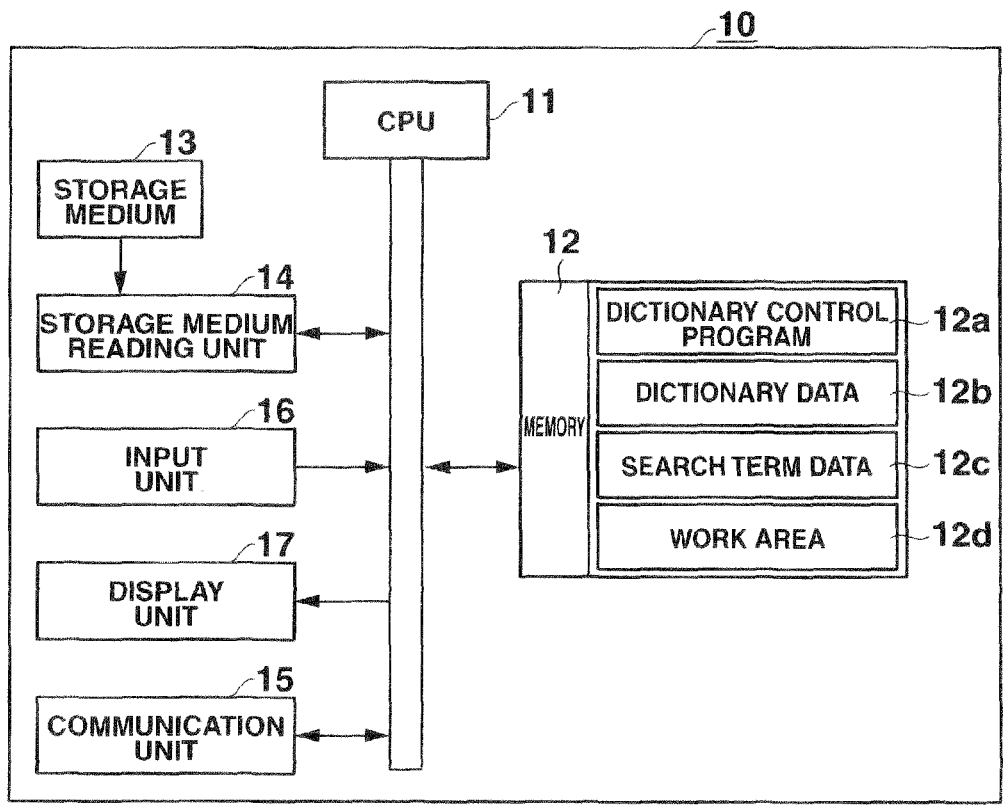
FIG. 1A is a block diagram showing a structure of an electronic circuit of a portable device (electronic dictionary) relating to one embodiment of an electronic dictionary apparatus of the present invention.

FIG. 1A is a block diagram showing a structure of an electronic circuit of a portable device (electronic dictionary) 10 relating to one embodiment of an electronic dictionary apparatus of the present invention.

The portable device (electronic dictionary) 10 is structured as a PDA (personal digital assistant), a PC (personal computer), a mobile telephone, or an electronic book having an electronic dictionary function which will be described hereinafter, or is structured as a portable device for exclusive use as an electronic dictionary.

The portable device (electronic dictionary) 10 includes programs recorded on various storage media, or a computer into which transmitted programs are loaded, and which is controlled in its operations by the read programs, and a CPU (central processing unit) 11 is provided to an electronic circuit thereof.

The CPU 11 is to control the operations of respective parts of the circuit in accordance within a device control program stored in advance in a memory 12, a device control program read in the memory 12 via a storage medium reading unit 14 from an external storage medium 13 such as a ROM card or the like, or a device control program read in the memory 12 via a communication unit 15 from a Web server on the Internet (a program server in this case). The device control program stored in the memory 12 is initiated in accordance with an input signal according to a user operation from an input unit 16 formed from keys and a touch panel, communication signals with respective Web servers on the Internet connected via the communication unit 15, or connection communication signals with a memory card (the external storage medium 13) such as an EEPROM, a RAM, a ROM, and the like, which is externally connected via the storage medium reading unit 14.

Not only the memory 12, the storage medium reading unit 14, the communication unit 15, and the input unit 16, but also a display unit 17 formed from an LCD, and the like are connected to the CPU 11.

In the memory 12, riot only a system program which manages operations of the entire portable device (electronic dictionary) 10, and a communication program for carrying out data communication with respective Web servers on the Internet via the communication unit 15 are stored, but also a dictionary control program 12a for downloading necessary dictionary data from a Web server for managing dictionaries or a memory card (storage medium), for searching and displaying various explanatory information such as translations, semantic contents, and the like of a vocabulary entry corresponding to an input of a search term on the basis of a dictionary data memory (12b), and for searching and displaying example sentences of use of the searched vocabulary entry, is stored.

Further, in the memory 12, the dictionary data memory 12b, a search term data memory 12c, a work area 12d, and the like are provided.

A large number of dictionary databases of different types such as Japanese dictionaries, Kanji-Japanese dictionaries, English-Japanese dictionaries, English-English dictionaries, Japanese-English dictionaries, and the like are stored in advance or so as to be downloaded. For example, "Contemporary American English Dictionary", "English Dictionary", and the like are stored as English-language dictionaries in the dictionary data memory 12b.

In the search term data memory 12c, words inputted by a user as languages/phrases serving as search objects, and the like are stored as search terms in accordance with search processing of the dictionary data memory 12b.

In the work area 12d, various data which are inputted to and outputted from the CPU 11 are stored as needed in accordance with various device control programs such as the dictionary control program 12a. For example, a plurality of example sentences searched along with example sentence search processing are stored.

Figure 1B:
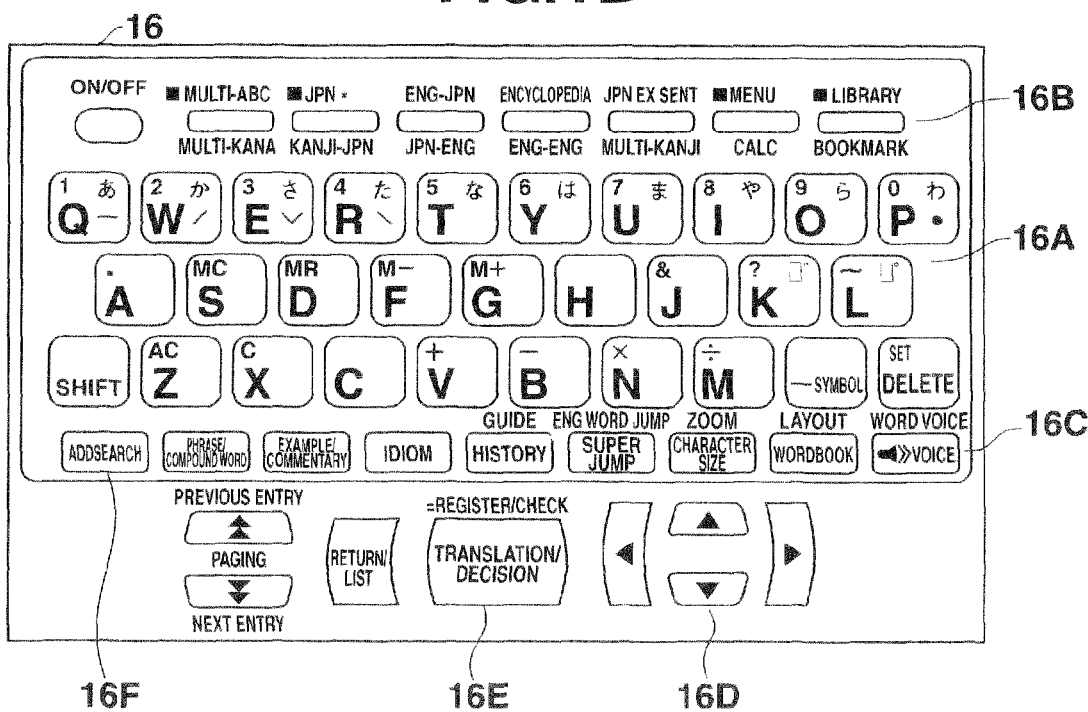
FIG. 1B is a plan view showing a key arrangement of an input unit of the portable device (electronic dictionary).

As shown in FIG. 1B, a series of character input keys 16A for arbitrarily inputting Hiragana, Katakana, Kanji, and alphanumeric, dictionary selection keys 16B for designating a dictionary to De used for search, function keys 16C for selecting various functions, cursor keys 16D for moving a cursor, a decision key 16E for carrying out search for a vocabulary entry corresponding to an inputted search term and explanatory information thereon with a target of a designated dictionary stored in the dictionary data memory 21b, and the like are provided on the keyboard panel of the input unit 16.

In the present embodiment, an additional search key ("AddSearch" key) 16F is further provided as one of the function keys 16C.

In the present embodiment, due to the additional search key 16F being provided, in the portable device (electronic dictionary) 10 having the above-described structure, in addition to the functions of the conventional electronic dictionary apparatus, it is possible to carry out an additional search which must be desired by a user by an operation easy to understand for the user. Namely, it is possible to execute various searches corresponding to respective search conditions as follows.

Namely, in vocabulary entry search from an English-language dictionary, it is possible to execute a spelling-check function by the CPU 11 in response to an operation of the additional search key 16F by the user in a state of displaying a list of vocabulary entries after inputting characters. For example, as shown in FIG. 2, at the time of executing vocabulary entry search with "English-Japanese Dictionary", when characters of "fora" are inputted in a vocabulary entry search input area, the dictionary data memory 12b is searched on the basis of the inputted character string, and vocabulary entries are list-displayed. In this vocabulary entry search, when no vocabulary entry corresponds to the inputted character string, there is a possibility that the spelling of the inputted character string is wrong. In such a case, the additional search key 16F is operated by the user. Then, the processing of the CPU 11 proceeds to spelling-check search, and spelling check is executed by the CPU 11, and a list of vocabulary entries serving as candidates for spelling check is displayed. Then, when a desired vocabulary entry is selected by operations of the up and down keys of the cursor keys 16D from the list of vocabulary entries serving as candidates for spelling checking, and the decision key 16E is operated, a translation corresponding to the selected and designated vocabulary entry is displayed full-screen.

Figure 3:
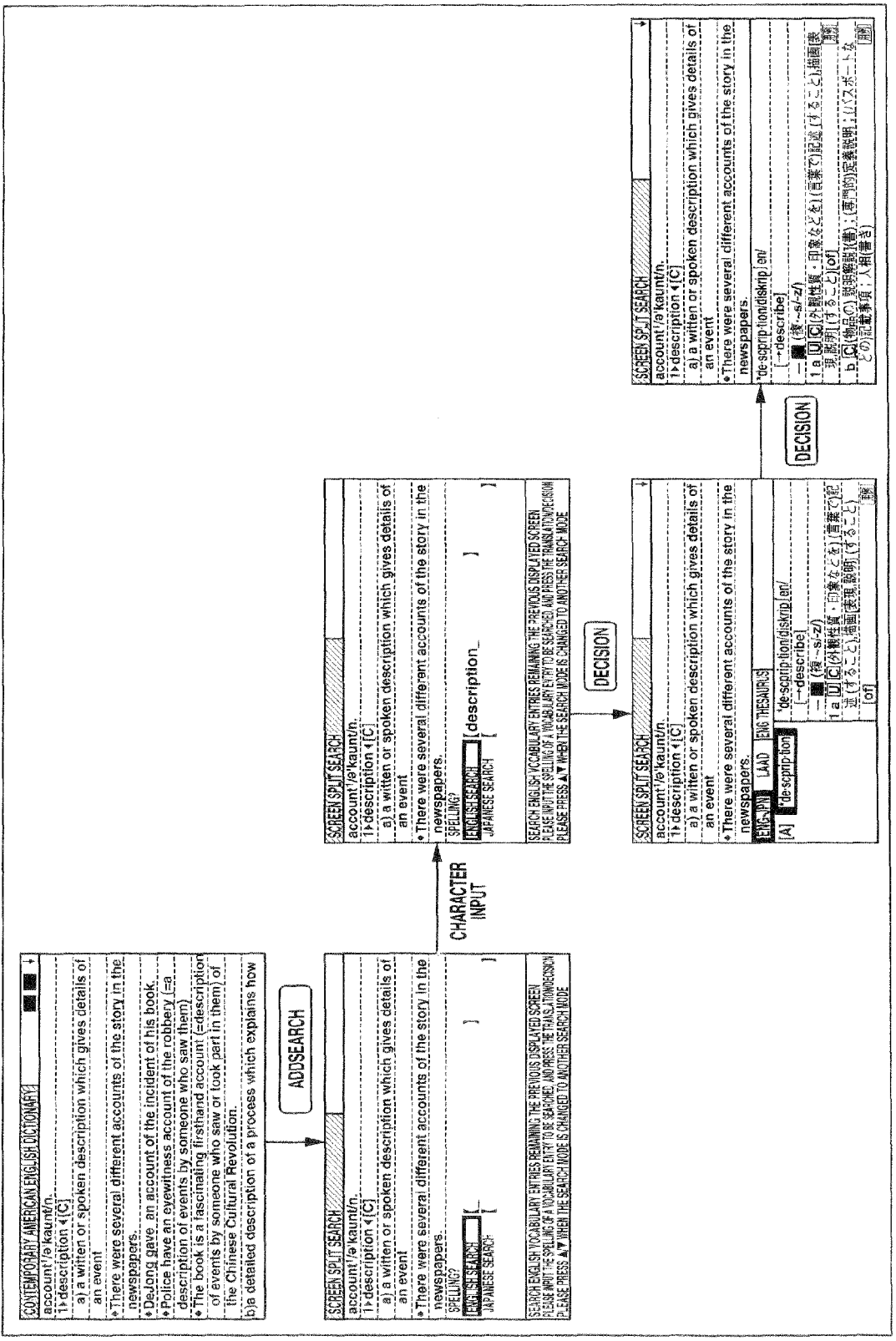
FIG. 3 is a diagram showing an example of transition of a display for explanation of operations in multi-dictionary search from a state of displaying translations in vocabulary entry search (both of English language/Japanese language) in the portable device (electronic dictionary).

Further, in vocabulary entry search (in both of English-language/Japanese-language), in a state of displaying translations, a sub-window for input of English/Japanese multi-dictionary search is displayed in response to an operation of the additional search key 16F by the user, and it is possible that the CPU 11 executes a multi-dictionary search function according to input search characters by the user into a desired input area (it goes without saying that it is possible to return to the previous screen). For example, as shown in FIG. 3, there are cases in which an attempt is made to know a translation of "description" in a state in which vocabulary entry search of "account" is carried out with "Contemporary American English Dictionary", and explanatory information on "account" is displayed. In such a case, the additional search key 16F is operated by the user. Then, a sub-window for searching a vocabulary entry to be displayed is displayed in the lower part of the screen by controlling of the CPU 11 while the currently displayed screen is left in the upper part. Then, when "description" is inputted into a desired input area in the sub-window, i.e., an input area for "English search" in this case, and the decision key 16E is operated, a plurality of dictionaries are searched with the newly inputted "description" serving as a search term, and a list of vocabulary entries is displayed. In this multi-dictionary example sentence search, it is possible to switch a dictionary for list display by operations of the left and right keys of the cursor keys 16D. Then, in a state in which a desired dictionary is selected, when a desired vocabulary entry is selected from the list of vocabulary entries thereof by operations of the up and down keys of the cursor keys 16D, and the decision key 16E is operated, a translation corresponding to the selected and designated vocabulary entry is displayed full-screen on the sub-window, i.e., is displayed in the lower part of the screen.

Figure 4:
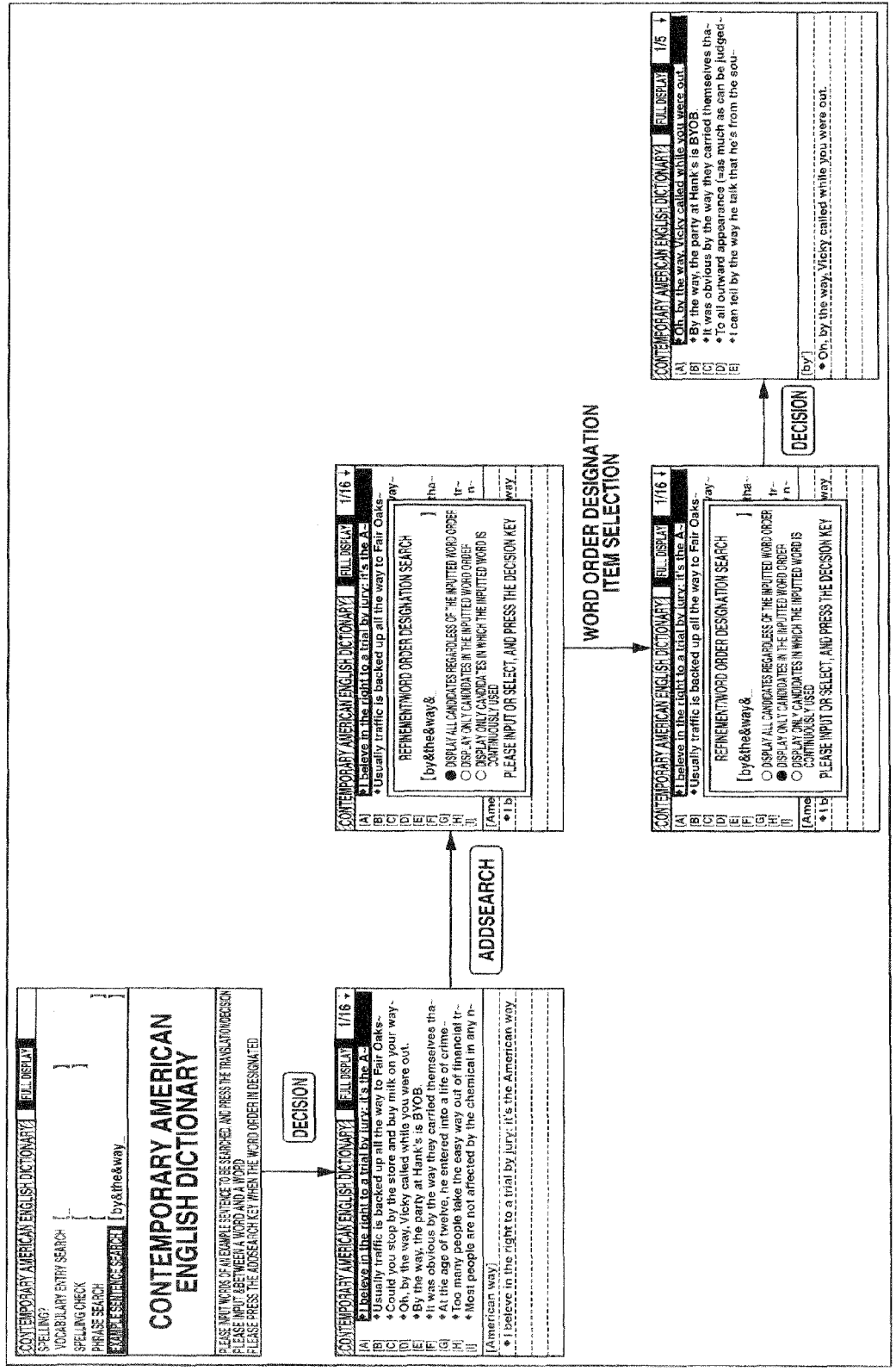
FIG. 4 is a diagram showing an example of transition of a display for explanation of operations for refining candidates during displays of a search screen/a list of example sentences in example sentence search/formed sentence search in the portable device (electronic dictionary).

During displays of a search screen/a list of example sentences in example sentence search/formed sentence search, in response to an operation of the additional search key 16F by the user, the CPU 11 is possible to refine candidates by adding a word to a current search term, or to refine candidates by specifying a word order of search candidates. For example, as shown in FIG. 4, when "by&the&way" is inputted into an input area for an example sentence search with "Contemporary American English Dictionary", and the decision key 16E is operated, example sentences including the three words of "by", "the", and "way" are list-displayed. In this case, because a word order of those three words cannot be designated, when an attempt is made to search example sentences including the idiom which is "by the way", unnecessary example sentences as well are list-displayed as example sentences. Then, in such a case, the additional search key 16F is operated by the user. Then, an additional search screen for carrying out refinement/word order designation search is displayed by controlling of the CPU 11. Then, when a word order is specified such that only the candidates in an inputted word order are displayed on the additional search screen, and the decision key 16F is operated, only the example sentences in the word order are list-displayed.

Figure 5:
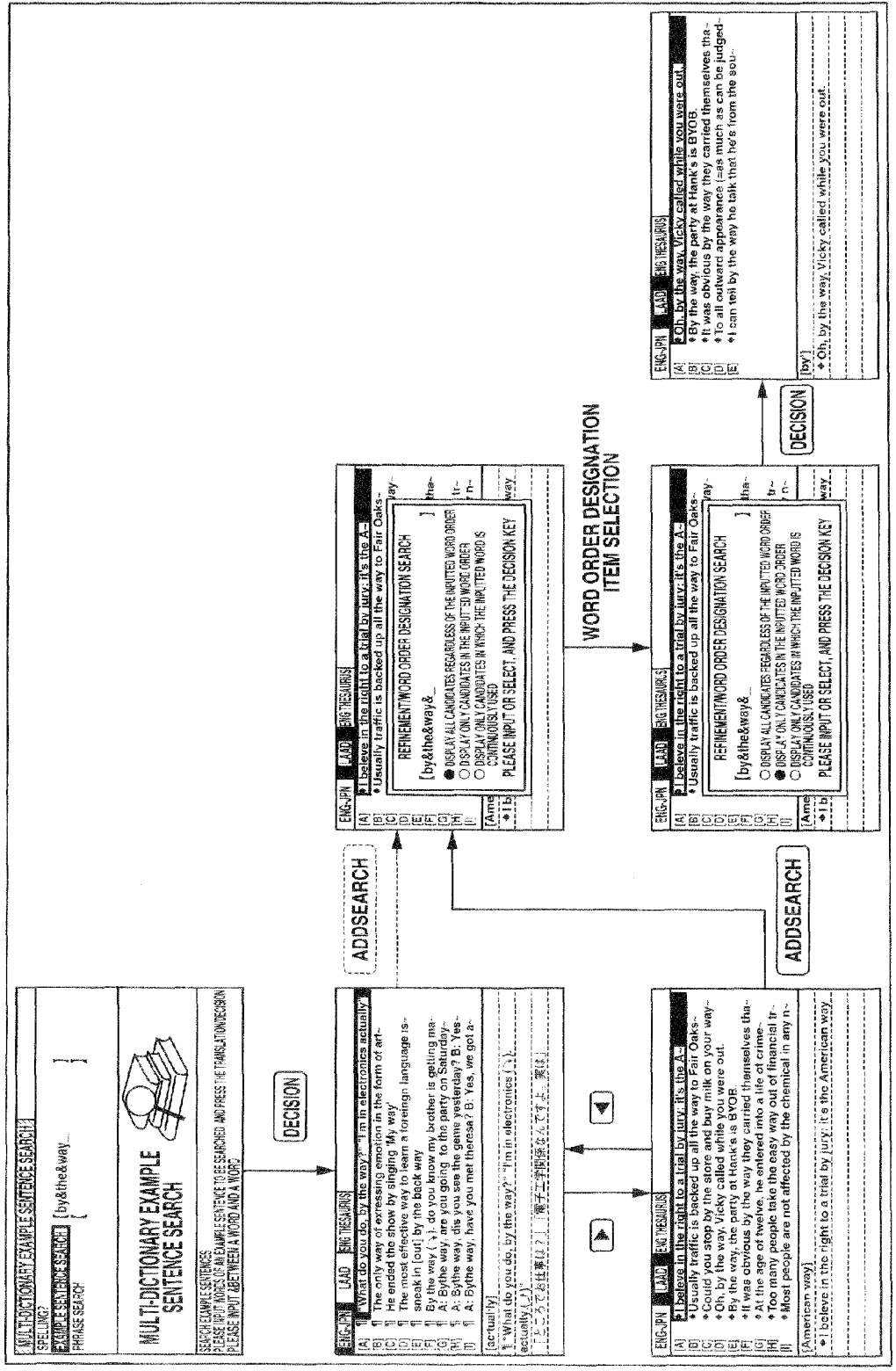
FIG. 5 is a diagram showing an example of transition of a display for explanation of operations for refining candidates during displays of a search screen/a list of example sentences in multi-dictionary example sentence search/formed sentence search in the portable device (electronic dictionary).

Moreover, in multi-dictionary example sentence search/formed sentence search, it is possible to refine candidates in the same way. For example, as shown in FIG. 5, when "by&the&way" is input into an input area for example sentence search in multi-dictionary example sentence search, and the decision key 16E is operated, example sentences including those three words of "by", "the", and "way" are list-displayed. In this multi-dictionary example sentence search, it is possible to switch a dictionary for list display by operations of the left and right keys of the cursor keys 16D. Then, in a state in which a desired dictionary is selected, the additional search key 16F is operated by the user. Then, an additional search screen for carrying out refinement/word order designation search is displayed by controlling of the CPU 11, and when a word order is specified such that only the candidates in an inputted word order are displayed, and the decision key 16E is operated, only the example sentences in the word order in the dictionary are list-displayed. it goes without saying that, when a dictionary for list display is switched by operations of the left and right keys of the cursor keys 16D, in the same way, only the example sentences in the word order in the switched dictionary are list-displayed. Note that, in FIG. 5, a case in which the additional search key 16F is operated by the user in a state in which the dictionary is switched to the "Contemporary American English Dictionary" has been shown, and it goes without saying that, when the additional search key 16F by the user is operated in a state in which another dictionary is selected, example sentences different from those in FIG. 5 are displayed.

Figure 6:
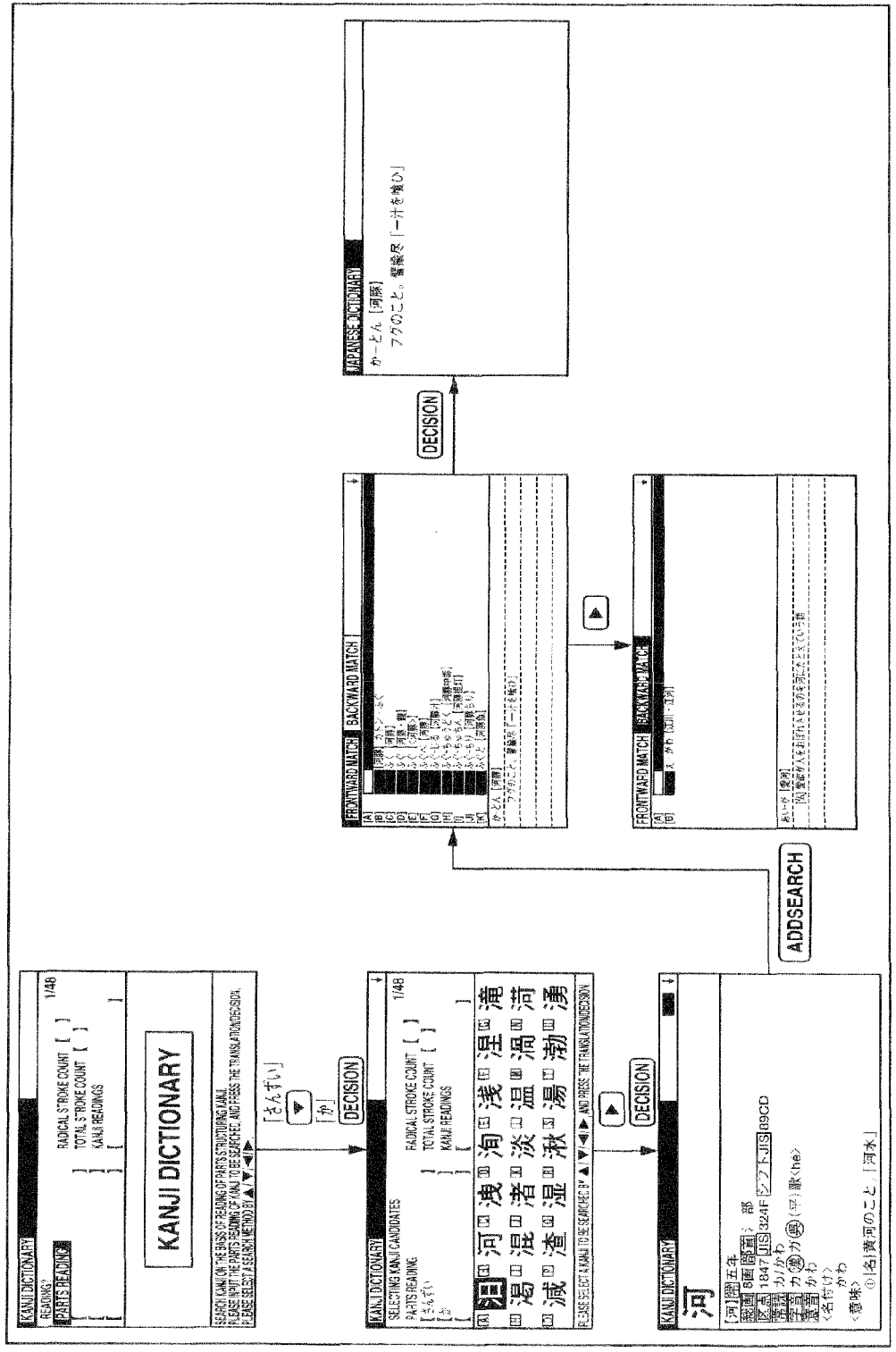
FIG. 6 is a diagram showing an example of transition of a display for explanation of operations of multi-dictionary Kanji search from a state in which a Kanji and explanatory information are displayed in a Kanji dictionary in the portable device (electronic dictionary).

Further, in a Kanji dictionary, in a state in which a Kanji and explanatory information are displayed, the CPU 11 is possible to execute multi-dictionary Kanji search by designating the Kanji in response to an operation of the additional search key 16, by the user. For example, as shown in FIG. 6, when "さんずい"("sanzui") and "か"("ka") are inputted into input areas for parts reading with "Kanji Dictionary", and the decision key 16E is operated, Kanji which are Kanji with "さんずい", and whose readings are started with "か"are list-displayed. Then, when a desired Kanji, for example, "河"("kawa") is selected by the cursor keys 16D, and the decision key 16E is operated, detailed information on the Kanji is displayed. Here, when an attempt is made to search idioms including the Kanji, the additional search key 16F is operated by the user. Then, vocabulary entries including the Kanji at the forefronts (frontward match) in respective dictionaries are list-displayed by controlling of the CPU 11. Then, when a desired vocabulary entry is selected by operations of the up and down keys of the cursor keys 16D from among the list-displayed vocabulary entries, and the decision key ICE is operated, explanatory information on the vocabulary entry "かとん"("katon") in the "Japanese Dictionary" in the example of FIG. 6) in the selected and designated dictionary is displayed full-screen. In this case as well, it goes without saying that, by switching to a dictionary for list display by operations of the left and right keys of the cursor keys 16D, vocabulary entries including the Kanji at the tail ends (backward match) in respective dictionaries are list-displayed, and it is possible to select one from among those.

Figure 7:
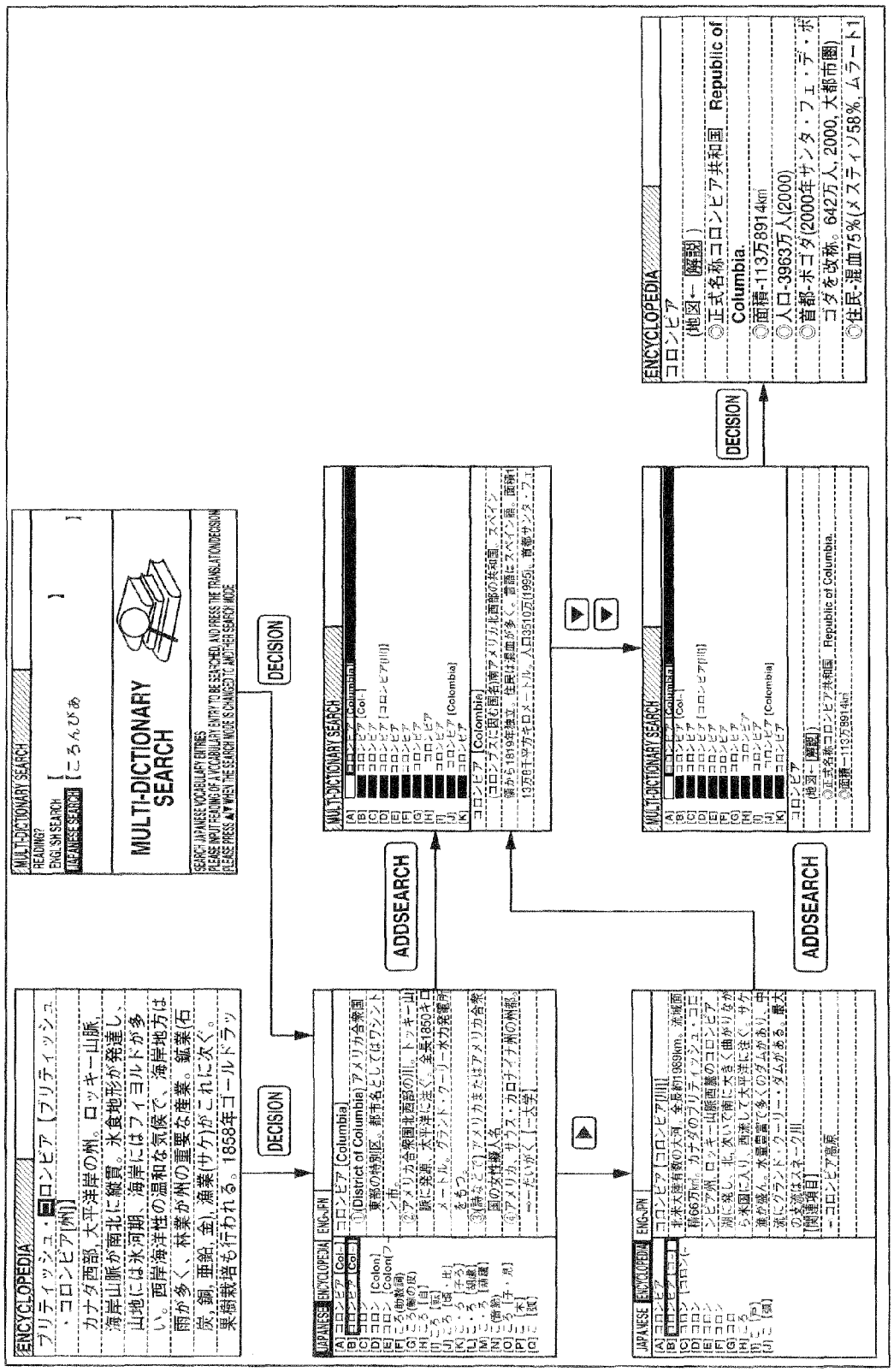
FIG. 7 is a diagram showing an example of transition of a display for explanation of operations for searching a vocabulary entry which is the same as a vocabulary entry designated by a cursor in a designated dictionary from the other plurality of dictionaries, from a state in which a list of vocabulary entries from one dictionary is displayed after multi-dictionary search or jump in the portable device (electronic dictionary).

Further, in a state in which a list of vocabulary entries in one dictionary is displayed after multi-dictionary search or jump, it is possible that the CPU 11 searches vocabulary entries which are the same as a vocabulary entry designated by a cursor in a designated dictionary can be searched from the other plurality of dictionaries, and list-displays collectively and vertically the searched vocabulary entries, in response to an operation of the additional search key 16F by the user. Usually, it is necessary to once switch dictionaries, which takes time. However, in accordance therewith, it is possible to immediately display words in order extending over a plurality of dictionaries. For example, as shown in FIG. 7, when "ころんびあ"(Columbia written in Hiragana) is inputted into an input area for Japanese search in multi-dictionary search, and the decision key 16E is operated, a list of vocabulary entries is displayed. Or, in the "Encyclopedia", when "ぶりてぃっしゅころんびあ"(British Columbia written in Hiragana) is designated as a search term, and search is executed, as shown in the upper left of FIG. 7, information on "ブリティッシュ・コロンビア"(British Columbia written in Katakana) is displayed, and when a (super) jump key of the function keys 16C is operated, a cursor is displayed, and when the cursor is moved to "コ"(Co written in Katakana) by an operation of the right key of the cursor keys 16D (the display example in the upper left of FIG. 7 shows this state), and the decision key 16E is operated, a list of vocabulary entries which are the same as those at the time of searching of "ころんびあ"(Columbia written in Hiragana) in the above-described multi-dictionary search is displayed. Here, it is possible to switch to a dictionary for list display by operations of the left and right keys of the cursor keys 16D. Further, it is possible to select a desired vocabulary entry by operations of the up and down keys of the cursor keys 16D Then, in a state in which a vocabulary entry is selected in one dictionary, the additional search key 16F is operated by the user. Then, the CPU 11 searches vocabulary entries which are the same as the selected and designated vocabulary entry (for example "コロンビア"(Columbia written in Katakana)) from the other plurality of dictionaries, and list-displays collectively and vertically the searched vocabulary entries. In this list display, when a vocabulary entry in a desired dictionary is selected by operations of the up and down keys of the cursor keys 16D, and the decision key 16E is operated, information on the vocabulary entry in the dictionary (in the example of the drawing, "コロンビア" in the "Encyclopedia") is displayed full-screen.

In the portable device (electronic dictionary) 10, in order to achieve functions as described above, examples of the dictionary control program 12a stored in the memory 12 will be described hereinafter.

Figure 8:
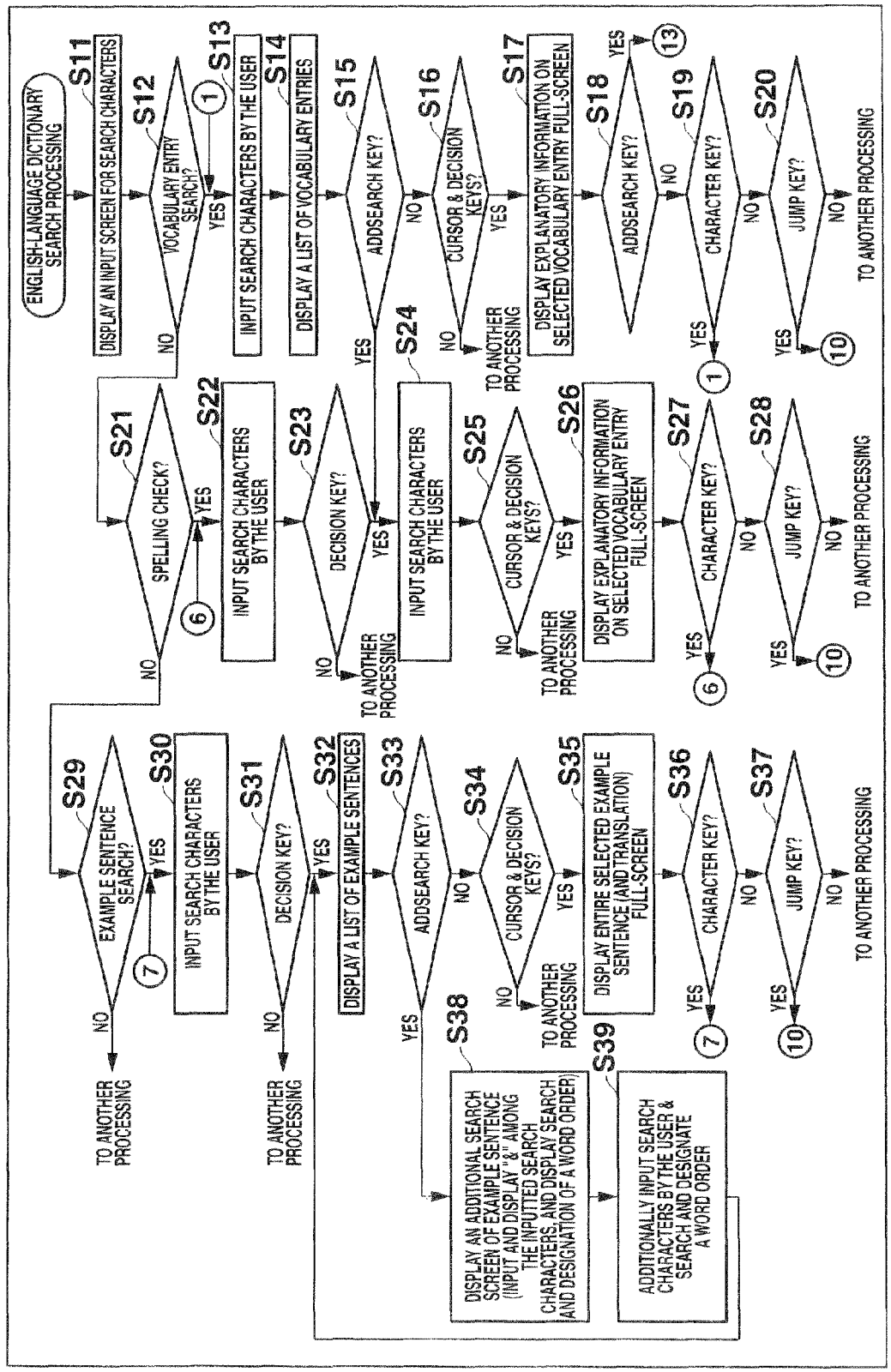
FIG. 8 is a diagram showing a flowchart for explanation of English-language dictionary search processing in a dictionary control program relating to one embodiment of a search control program in the present invention.

FIG. 8 is a diagram showing a flowchart for explanation of English-language dictionary search processing in the dictionary control program 12a.

Namely, when search from an English-language dictionary is designated by an operation of the dictionary selection keys 16B of the input unit 16, an input screen for search characters as shown in FIG. or FIG. 4 is displayed on the display unit 17 (step S11).

Then, when vocabulary entry search is selected by operations of the cursor keys 16D of the input unit 16 by the user (step S12), search characters serving as a search term are inputted into an input area for vocabulary entry search on the input screen by operations of the character input keys 16A of the input unit 16 by the user, and the inputted character string is stored in the search term data memory 12c of the memory 12 (step S13). Then, search from a designated dictionary in the dictionary data memory 12b of the memory 12 is carried out with the search characters, and a list of searched vocabulary entries is displayed on the display unit 17 (step S13). Note that the character input by the user and the search according thereto, and the list display of vocabulary entries as the result thereof are carried out every time when one character is inputted as shown in FIG. 2. However, here, to simplify the explanation, descriptions thereof will be omitted.

Thereafter, it is determined whether or not the additional search key 16F of the input unit 16 has been operated by the user (step S15). Here, when the additional search key 16F has been operated by the user, the CPU 11 proceeds to a processing of step S24, which will he described later.

In contrast thereto, when the additional search key 16F has not been operated by the user, the CPU 11 determines whether or not the cursor keys 16D of the input unit 16 have been operated, and the decision key 16E has been further operated (step S16). Here, when operations other than such operations have been operated, the CPU 11 proceeds to processing corresponding to the operations (another processing). However, because this is not the feature part of the present invention, descriptions thereof will be omitted (hereinafter, in the same way, descriptions of parts which are not the feature part of the present invention will be omitted).

On the other hand, when the cursor keys 16D have been operated, and the decision key 16E has been further operated, which means that the user has selected a desired vocabulary entry from the list of vocabulary entries, explanatory information on the selected vocabulary entry is displayed full-screen on the display unit 17 (step S17). Then thereafter, the CPU 11 determines again whether or not the additional search key 16F of the input unit 16 has been operated by the user (step S18). Here, when the additional search key 16F has been operated by the user, the CPU 11 proceeds to a processing of step S112 which will be described later.

In contrast thereto, when the additional search) key 16F has not been operated, the CPU 11 determines whether or not the character input keys 16A of the input unit 16 have been operated by the user (step S19). Here, when the character input keys 16A have been operated, the routine returns to the step S13. Further, when the character input keys 16A have not been operated, it is further determined whether or not the (super) jump key of the function keys 16C of the input unit 16 has been operated (step S12). Here, in such a case in which the jump key has been operated, the CPU 11 proceeds to a processing of step S108 which will be described later, and when the jump key has not been operated, the CPU 11 proceeds to another processing.

Further, when spelling check is selected by operations of the cursor keys 16D of the input unit 16 by the user on the input screen for search characters displayed at the step S11 (step S21), search characters serving as a search term are inputted into an input area for spelling check on the above-described input screen by operations of the character input keys 16A of the input unit 16 by the user, and the inputted character string is stored in the search term data memory 12c of the memory 12 (step S22). Then, it is determined whether or not the decision key 16E has been operated (step S23), and when it has not been operated, the CPU 11 proceeds to another processing. In contrast thereto, when the decision key 16E has been operated, spelling check is executed in a designated dictionary in the dictionary data memory 12b of the memory 12 with the search characters stored in the search term data memory 12c, and a list of searched vocabulary entries as candidates for spelling check is displayed on the display unit 17 (step S24).

Note that, when the step S24 is executed in accordance with determination on a user operation of the additional search key 16F at the step S15, because the search characters inputted for the vocabulary entry search have been already stored in the search term data memory 12c of the memory 12, the CPU 11 carries out spelling check with the search characters In accordance therewith, spelling check according to a user operation of the additional search key 16F as shown in FIG. 2 is possible.

After a list of vocabulary entries as candidates for spelling check is displayed in this way, it is determined whether or not the cursor keys 16D of the input unit 16 have been operated, and the decision key 16E has been further operated (step S25). Here, when operations other than such operations have been operated, the CPU 11 proceeds to another processing.

On the other hand, when the cursor keys 16D have been operated, and the decision key 16E has been further operated, which means that the user has selected a desired vocabulary entry from the list of vocabulary entries as candidates for spelling check, explanatory information on the selected vocabulary entry is displayed full-screen on the display unit 17 (step S26). Then, thereafter, it is determined whether or not the character input keys 16A have been operated by the user (step S27). Here, when the character input keys 16A have been operated, the routine returns to the step S22. In contrast thereto, when the character input keys 16A have not been operated, it is further determined whether or not the (super) jump key of the function keys 16C has been operated (step S28). Here, in such a case in which the jump key has been operated, the CPU 11 proceeds to a processing of step S108 which will be described later, and when the jump key has not been operated, the CPU 11 proceeds to another processing.

Further, when example sentence search is selected by operations of the cursor keys 16D of the input unit 16 by the user on the input screen for search characters displayed at the step S11 (step S29), search characters serving as a search term are inputted into an input area for an example sentence search on the input screen by operations of the character input keys 16A by the user, and the inputted character string is stored in the search term data memory 12c of the memory 12 (step S30). Then, it is determined whether or not the decision key 16E has been operated (step 531), and when it has not been operated, the CPU 11 proceeds to another processing. In contrast thereto, when the decision key 16E has been operated, example sentence search is executed from a designated dictionary in the dictionary data memory 12b of the memory 12 with the search characters stored in the search term data memory 12c, and a list of searched example sentences is displayed on the display unit 17 (step S32).

Thereafter, the CPU 11 determines whether or not the additional search key 16F has been operated by the user (step S33). Here, when the additional search key 16F has not been operated by the user, the CPU 11 determines whether or not the cursor keys 16D have been operated, and the decision key 16E has been further operated by the user (step S34). Here, when operations other than such operations have been operated by the user, the CPU 11 proceeds to another processing.

On the other hand, when the cursor keys 16D have been operated, and the decision key 16E has been further operated, which means that the user has selected a desired example sentence from the list of example sentences, the entire selected example sentence (and the translation thereof as well in some cases) is displayed full-screen on the display unit 17 (step S35). Then, thereafter, it is determined whether or not the character input keys 16A have been operated by the user (step S36). Here, when the character input keys 16A have been operated, the routine returns to the step S30. In contrast thereto, when the character input keys 16A have not been operated, it is further determined whether or not the (super) jump key of the function keys 16C has been operated (step S37). Here, in such a case in which the jump key has been operated, the CPU 11 proceeds to a processing of step S108 which will be described later, and when the jump key has not been operated, the CPU 11 proceeds to another processing.

Further, when the CPU 11 determines that the additional search key 16F has been operated by the user in the list display of searched example sentences al the step S33, an additional search screen of example sentences is displayed (step S38). This additional search screen of example sentences is, as shown in FIG. 4, displayed by inputting "&" in the tail of the inputted search characters stored in the search term data memory 12c of the memory 12, and to carry out display for carrying out search and designation of a word order. Then, an additional input of search characters and/or search and designation of a word order by a user are received (step S39), and the routine returns to the step S32. In accordance therewith, new example sentence search is executed with additionally inputted search characters or search characters in a designated word order thereby, which updates the d-splay of the list of example sentences.

Note that when processing other than vocabulary entry search, spelling check, and example sentence search is designated by the user on the input screen for search characters displayed at the step S11, another processing corresponding thereto is to be executed.

Figure 9:
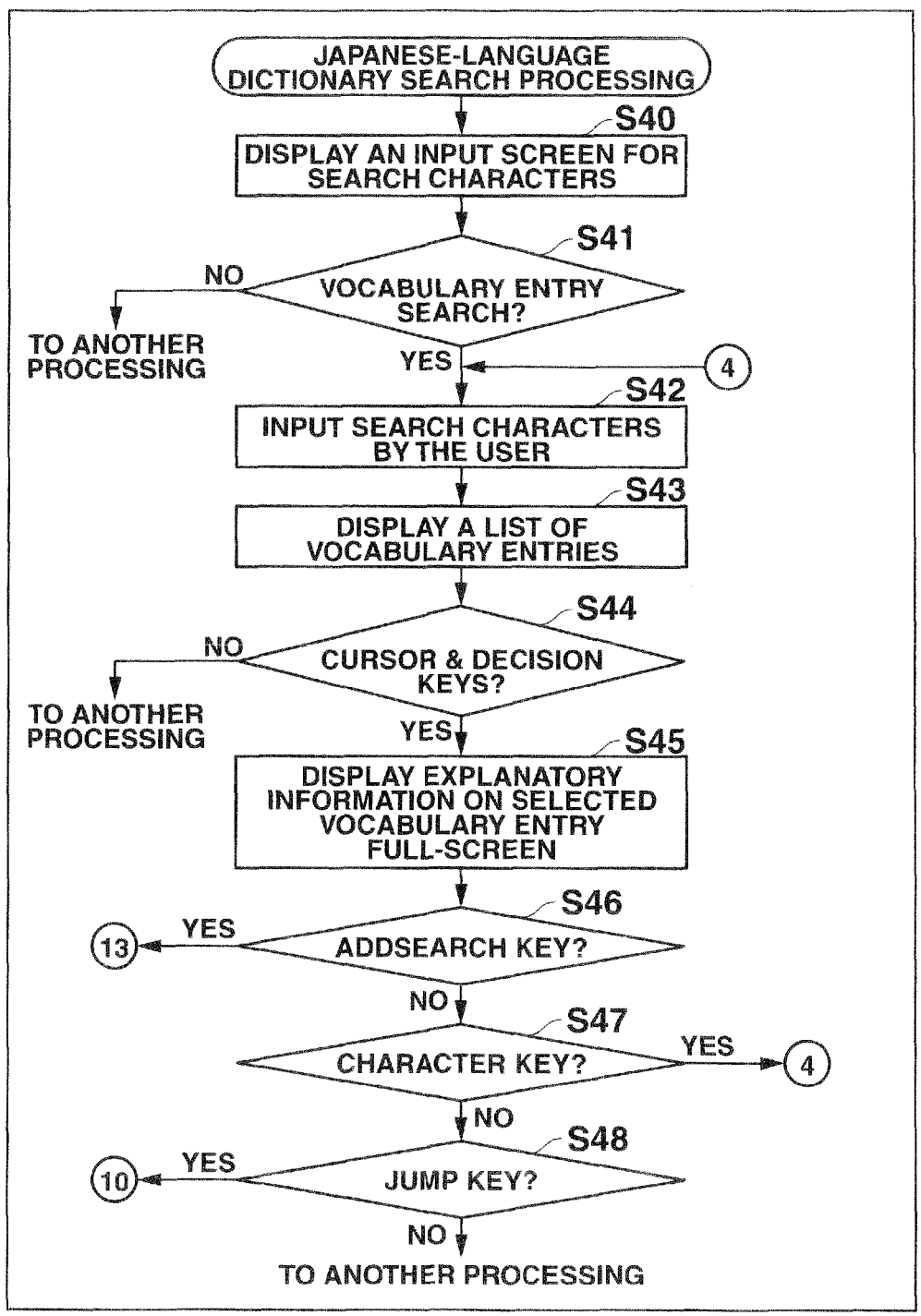
FIG. 9 is a diagram showing a flowchart for explanation of Japanese-language dictionary search processing in the dictionary control program.

FIG. 9 is a diagram showing a flowchart for explanation of Japanese-language dictionary search processing in the dictionary control program 12a.

Namely, when search from a Japanese-language dictionary is designated by an operation of the dictionary selection keys 16B of the input unit 16, an input screen for search characters is displayed on the display unit 17 (step S40).

Then, when vocabulary entry search is selected by operations of the cursor keys BED by the user (step S41), search characters serving as a search term are inputted into an input area for vocabulary entry search on the Input screen by operations of the character input keys 16A by the user, and the inputted character string is stored in the search term data memory 12c of the memory 12 (step S42). Then, search from a designated dictionary in the dictionary data memory 12b of the memory 12 is carried out with the search characters, and a list of searched vocabulary entries is displayed on the display unit 17 (step S43).

Thereafter, it is determined whether or rot the cursor keys 16D have been operated, and the decision key 16E has been further operated by the user (step S44). Here, when operations other than such operations have been operated, the CPU 11 proceeds to another processing.

On the other hand, when the cursor keys 16D have been operated, and the decision key 16E has been further operated, which means that the user has selected a desired vocabulary entry from the list of vocabulary entries, explanatory Information on the selected vocabulary entry is displayed full-screen on the display unit 17 (step S45). Then, thereafter, the CPU 11 determines whether or not the additional search key 16F has been operated by the user (step S46). Here, when the additional search key 16F has been operated by the user, the CPU 11 proceeds to a processing of step S112, which will be described later.

In contrast thereto, when the additional search key 16F has not been operated by the user, the CPU 11 determines whether or not the character input keys 16A have been operated (step S47). Here, when the character input keys 16A have been operated, the routine returns to the step S42. Further, when the character input keys 16A have not been operated, it is further determined whether or not the (super) jump key of the function keys 16C has been operated (step S48). Here, in such a case in which the jump key has been operated, the CPU 11 proceeds to a processing of step S108 which will be described later, and when the jump key has not been operated, the CPU 11 proceeds to another processing.

Further, when it is determined that processing other than vocabulary entry search has been selected on the input screen for search characters at the step 541, the CPU 11 proceeds to another processing.

Figure 10:
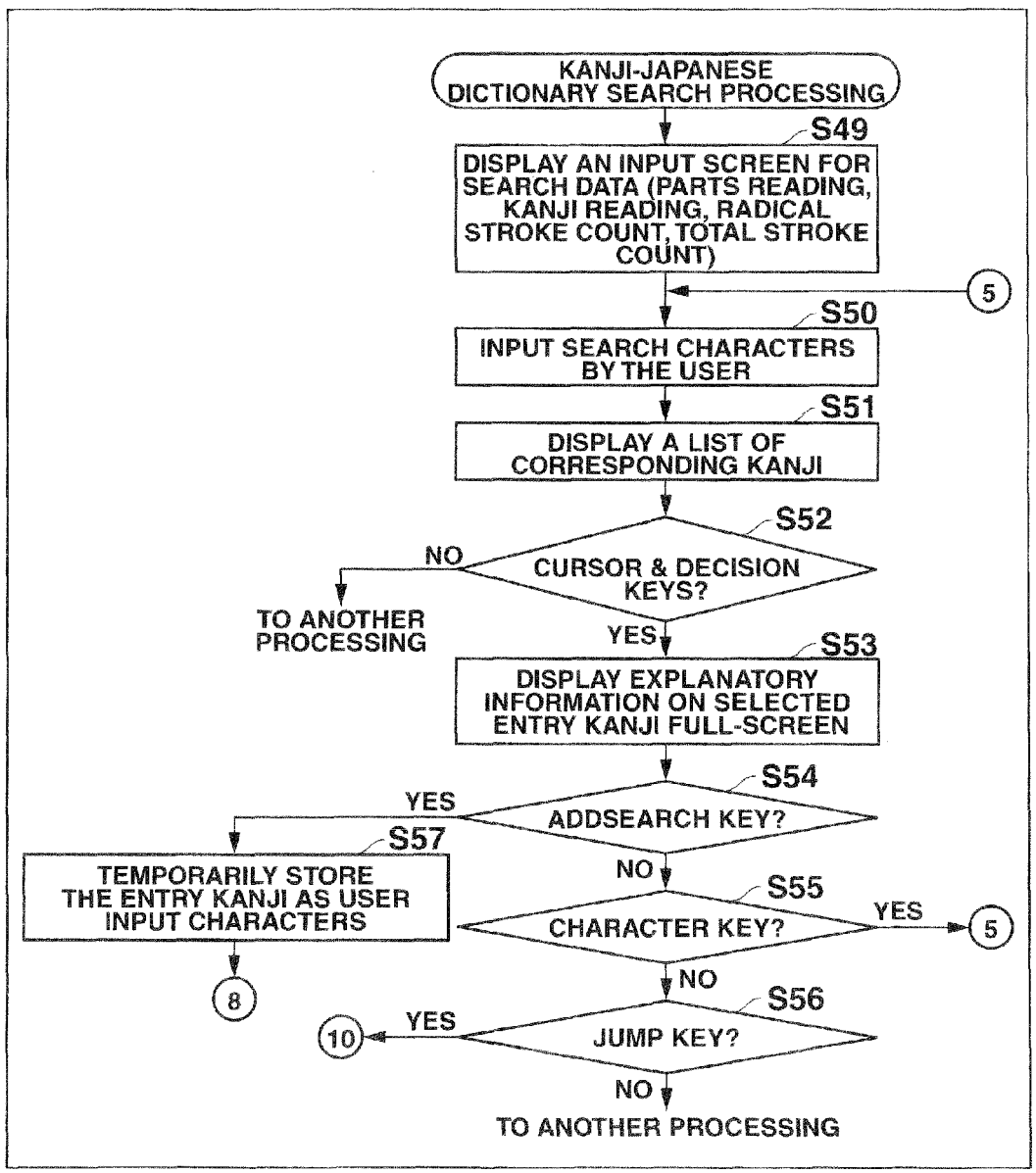
FIG. 10 is a diagram showing a flowchart for explanation of Kanji-Japanese dictionary search processing in the dictionary control program.

FIG. 10 is a diagram showing a flowchart for explanation of Kanji-Japanese dictionary search processing in the dictionary control program 12a.

Namely, when search from a Kanji-Japanese dictionary is designated by an operation of the dictionary selection keys 16B of the input unit 16, an input screen for search data (parts reading, radical stroke count, total stroke count, Kanji readings) is displayed on the display unit 17 as shown in FIG. 6 (step S49).

Then, search data serving as a search term are inputted on the input screen by operations of the character input keys 16A by the user, and the inputted search data are stored in the search term data memory 12c of the memory 12 (step S50). Then, search from a designated dictionary in the dictionary data memory 12b of the memory 12. is carried out with the search data, and a list of searched Kanji is displayed on the display unit 17 (step S51).

Thereafter, it is determined whether or n t the cursor keys 16D have been operated, and the decision key 16E has been further operated by the user (step S52). Here, when operations other than such operations have been operated, the CPU 11 proceeds to another processing.

On the other hand, when the cursor keys 16D have been operated, and the decision key 16E has been further operated, which means that the user has selected a desired Kanji from the list of searched Kanji, explanatory information on the selected Kanji is displayed full-screen on the display unit 17 (step S53). Then, thereafter, the CPU 11 determines whether or not the additional search key 16F has been operated by the user (step S54). Here, when the additional search key 16F has not been operated by the user, the CPU 11 determines whether or not the character input keys 16A have been operated (step S55). Here, when the character input keys 16A have been operated, the routine returns to the step S50. Further, when the character input keys 16A have not been operated, it is further determined whether or not the (super) jump key of the function keys 16C has been operated (step S56). Here, in such a case in which the jump key has been operated, the CPU 11 proceeds to a processing of step S108 which will be described later, and when the jump key has not been operated, the CPU 11 proceeds to another processing.

Further, when the CPU 11 determines that the additional search key 16F has been operated by the user at the step S54, after the selected Kanji is temporarily stored as a user input character into the work area 12d of the memory 12 (step S57), the CPU 11 proceeds to a processing of step S104 which will be described later.

Figure 11:
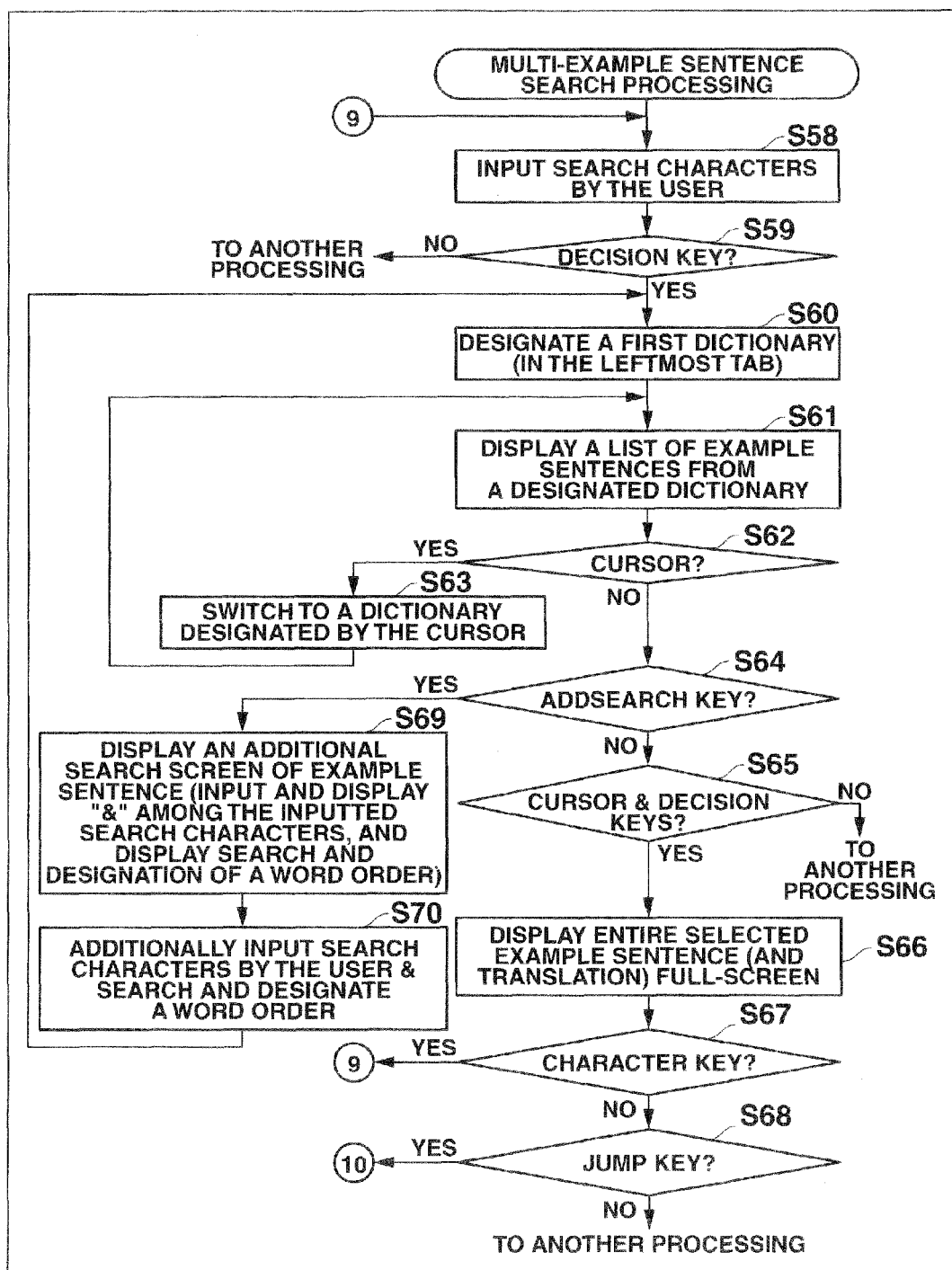
FIG. 11 is a diagram showing a flowchart for explanation of multi-example sentence search processing in the dictionary control program.

FIG. 11 is a diagram showing a flowchart for explanation of multi-example sentence search processing in the dictionary control program 12a.

Namely, when example sentence search from a plurality of dictionaries is designated by an operation of the dictionary selection keys 16B of the input unit 16, as shown in FIG. 5, an input screen for example sentences/formed sentences is displayed on the display unit 17, and search characters serving as a search term are inputted into an input area selected by operations of the cursor keys 16D by the user, by operations of the character input keys 16A by the user, and the inputted character string is stored in the search term data memory 12c of the memory 12 (step S58). Then, it is determined whether or riot the decision key 16E has been operated (step S59), and when it has not been operated, the CPU 11 proceeds to another processing In contrast thereto, when the decision key 16E has been operated, a first dictionary is designated (step S60), example sentence search is executed from a designated dictionary in the dictionary data memory 12b of the memory 12 with the search characters stored in the search term data memory 12c, and a list of searched example sentences is displayed on the display unit 17 as shown in FIG. 5 (step S61). Note that, here, the first dictionary is a dictionary shown in the leftmost tab (the "English-Japanese dictionary" ("ENG-JAP") n this example). However, for example, the dictionary which the user previously selected is stored in the memory 12, and that may be designated as the first dictionary.

Thereafter, it is determined whether or not the left and right keys of the cursor keys 16D have been operated by the user (step S63), and when the cursor keys 16D have been operated, the designated dictionary is changed to a dictionary designated by the cursor (step S63), and the routine returns to the step S61. In accordance therewith, example sentence search is executed from the changed dictionary.

Further, when the CPU 11 determines that the cursor keys 16D have not been operated at the step S62, next, it determines whether or not. the additional search key 16F has been operated by the user (step S64). Here, when the additional search key 16F has not been operated by the user, the CPU 11 determines whether or not the cursor keys 16D have been operated, and the decision key 16E has been further operated (step S65). Here, when operations other than such operations have been operated by the user, the CPU 11 proceeds to another processing.

On the other hand, when the cursor keys 16D have been operated, and the decision key 16E has been further operated, which means that the user has selected a desired example sentence from the list of example sentences, the entire selected example sentence (and the translation thereof as well in some cases) is displayed full-screen on the display unit 17 (step S66). Then, thereafter, it is determined whether or not the character input keys 16A have been operated by the user (step S67). Here, when the character input keys 16A have been operated, the routine returns to the step S58. In contrast thereto, when the character input keys 16A have not been operated, it is further determined whether or not the (super) jump key of the function keys 16C has been operated (step S68). Here, in such a case in which the jump key has been operated, the CPU 11 proceeds to a processing of step S108, which will be described later, and when the jump key has not been operated, the CPU 11 proceeds to another processing.

Further, when the CPU 11 determines that the additional search key 16F has been operated by the user in the list display of searched example sentences at the step S64, an additional search screen of example sentences is displayed (step S69). This additional search screen of example sentences is, as shown in FIG. 5, displayed by inputting "&" in the tail of the inputted search characters stored in the search term data memory 12c of the memory 12, and to carry out display for carrying out search and designation of a word order. Then, an additional input of search characters and/or search and designation of a word order by the user are received (step S70), and the routine returns to the step S60. In accordance therewith, new example sentence search is executed with additionally inputted search characters or search characters in a designated word order thereby, which updates the list display of example sentences. Note that the routine may return from the step S70 to the step S61. FIG. 6 shows an example of such a case (an example after the designated dictionary is changed to the "Contemporary American English Dictionary" ("AAD")).

Figure 12:
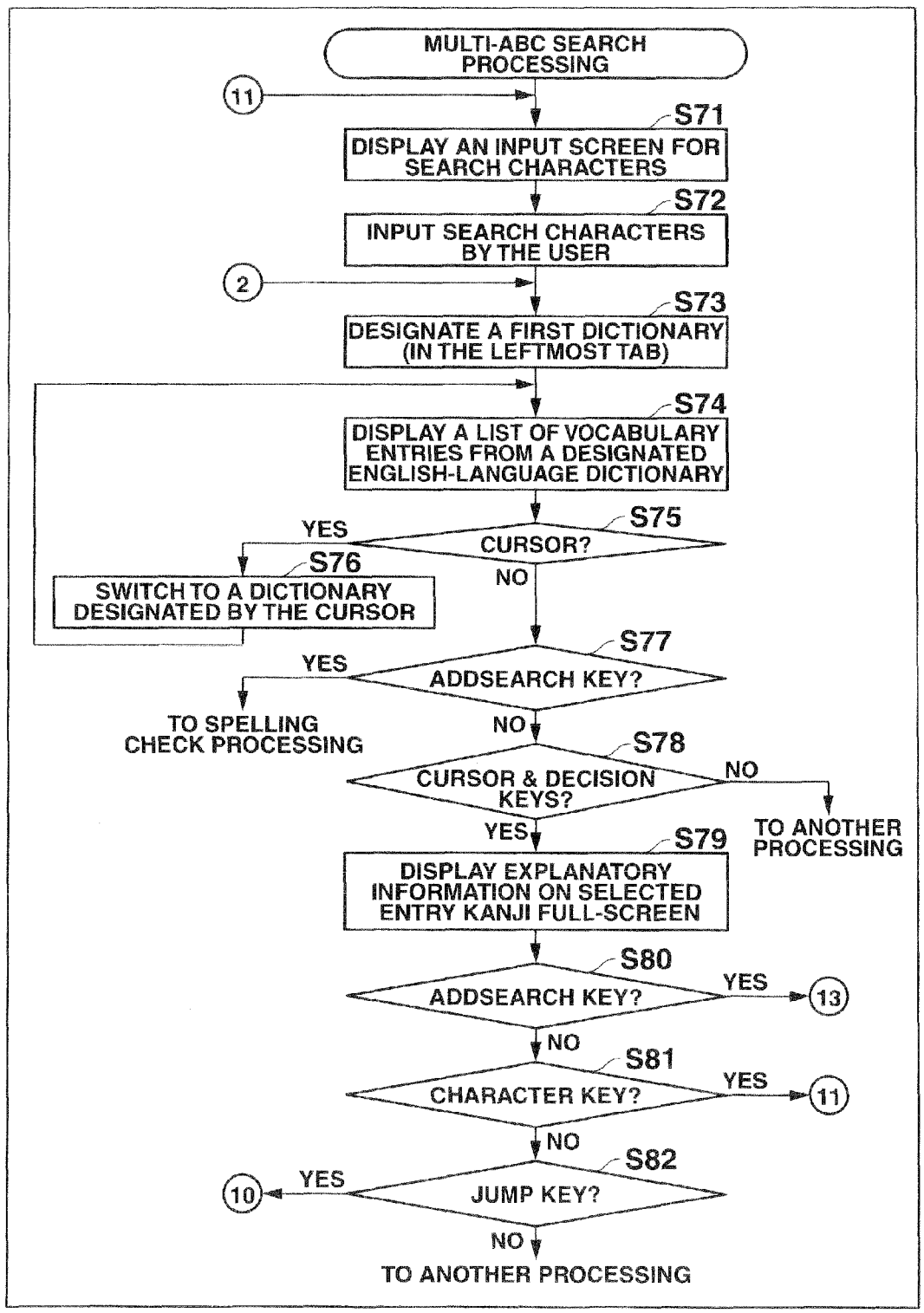
FIG. 12 is a diagram showing a flowchart for explanation of multi-ABC search processing in the dictionary control program.

FIG. 12 is a diagram showing a flowchart for explanation of multi-ABC search processing in the dictionary control program 12a.

Namely, when multi-dictionary search is designated by an operation of the dictionary selection keys 16B of the input unit 16, an input screen for search characters is displayed on the display unit 17 (step S71), search characters serving as a search term are inputted into an input area selected by operations of the cursor keys 16D by the user (an input area for English search in this case), by operations of the character input keys 16A by the user, and the inputted character string is stored in the search term data memory 12c of the memory 12 (step S72). Then, a first dictionary is designated from a plurality of English-language dictionaries (step S73), vocabulary entry search is executed from a designated English-language dictionary in the dictionary data memory 12b of the memory 12 with the search characters stored in the search term data memory 12c, and a list of searched vocabulary entries is displayed on the display unit 17 (step S74). Note that, here, the first dictionary is a dictionary shown in the leftmost tab. However, for example, the dictionary which the user previously selected is stored in the memory 12, and that may be designated as the first dictionary.

Thereafter, it is determined whether or not the left and right keys of the cursor keys 16D have been operated by the user (step S75), and when the cursor keys 16D have been operated, the designated dictionary is changed to an English-language dictionary designated by the cursor (step S76), and the routine returns to the step S74. In accordance therewith, vocabulary entry search is executed from the changed English-language dictionary.

Further, when the CPU 11 determines that the cursor keys 16D have not been operated at the step S75, next, it determines whether or not the additional search key 16F has been operated by the user (step S77). Here, when the additional search key 16F has been operated by the user, the CPU 11 executes spelling check processing, which is the same as that described above.

In contrast thereto, when the additional search key 16F has not been operated by the user, the CPU 11 determines whether or not the cursor keys 16D have been operated, and the decision key 16E has been further operated (step S78). Here, when operations other than such operations have been operated by the user, the CPU 11 proceeds to another processing.

On the other hand, when the cursor keys 16D have been operated, and the decision key 16E has been further operated, which means that the user has selected a desired vocabulary entry from the list of vocabulary entrees, explanatory information on the selected vocabulary entry is displayed full-screen on the display unit 17 (step S79). Then, thereafter, the CPU 11 determines whether or not the additional search key 16F has been operated by the user (step S80). Here, when the additional search key 16F has been operated by the user, the CPU 11 proceeds to a processing of step S112, which will be described later.

Further, when the additional search key 16F has not been operated by the user, the CPU 11 further determines whether or not the character input keys 16A have been operated (step S81). Here, when the character input keys 16A have been operated, the CPU 11 returns to the processing of the step S71. In contrast thereto, when the character input keys 16A have not been operated, it is further determined whether or not the (super) jump key of the function keys 16C has been operated (step S82). Here, in such a case in which the jump key has been operated, the CPU 11 proceeds to a processing of step S108, which will be described later, and when the jump key has not been operated, the CPU 11 proceeds to another processing.

Figure 13:
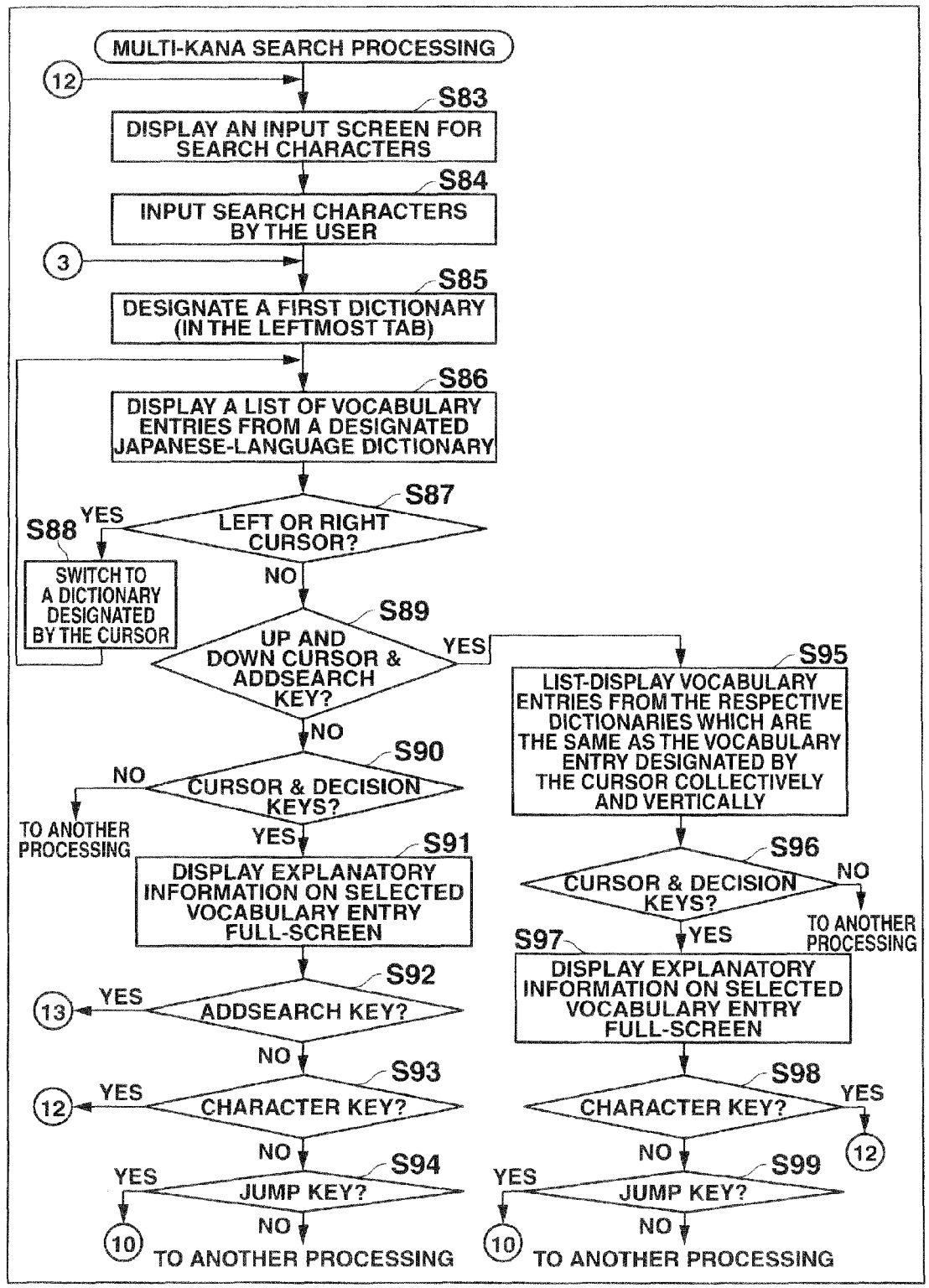
FIG. 13 is a diagram showing a flowchart for explanation of multi-Kana search processing in the dictionary control program.

FIG. 13 is a diagram showing a flowchart for explanation of multi-Kana search processing in the dictionary control program 12a.

Namely, when multi-dictionary search is designated by an operation of the dictionary selection keys 16B of the input unit 16, an input screen for search characters is displayed on the display unit 17 (step S83), and search characters serving as a search term are inputted into an input area selected by operations of the cursor keys 16D by the user (an input area for Japanese search in this case), by operations of the character input keys 16A by the user, and the inputted character string is stored in the search term data memory 12c of the memory 12 (step S84). Then, a first dictionary is designated from a plurality of Japanese-language dictionaries (step S85), and vocabulary entry search is executed from a designated Japanese-language dictionary in the dictionary data memory 12b of the memory 12 with the search characters stored in the search term data memory 12c, and a list of searched vocabulary entries is displayed on the display unit 17 (step S86). Note that, here, the first dictionary is a dictionary shown in the leftmost tab. However, for example, the dictionary which the user previously selected is stored in the memory 12, and that may be designated as the first dictionary.

Thereafter, it is determined whether or not the left and right keys of the cursor keys 16D have been operated by the user (step S87), and when the cursor keys 16D have been operated, the designated dictionary is changed to a Japanese-language dictionary designated by the cursor (step S88), and the routine returns to the step S86. In accordance therewith, example sentence search is executed from the changed Japanese-language dictionary.

Further, when the CPU 11 determines that the left and right keys of the cursor keys 16D have not been operated at the step S87, next, it determines whether or not the up and down keys of the cursor keys 16D have been operated, and the additional search key 16F has been further operated by the user (step S89). Here, when the cursor keys 16D have been operated, and the additional search key 163 has not been operated by the user, the CPU 11 determines whether or not the up and down keys of the cursor keys 16D have been operated, and the decision key 26E has been further operated (step S90). Here, when operations other than such operations have been operated, the CPU 11 proceeds to another processing.

On the other hand, when the cursor keys 16D have been operated, and the decision key 16E has been further operated, which means that the user has selected a desired vocabulary entry from the list of vocabulary entries, explanatory information on the selected vocabulary entry is displayed full-screen on the display unit 17 (step S91). Then, thereafter, it is determined whether or not the additional search key 165 has been operated by the user (step S92). Here, when the additional search key 16F has been operated by the user, the CPU 11 proceeds to a processing of step 5112, which will be described later.

Further, when the additional search key 165 has not been operated by the user, the CPU 11 further determines whether or not the character input keys 16A have been operated (step S93). Here, when the character input keys 16A have been operated, the CPU 11 returns to the processing of the step 53. In contrast thereto, when the character input keys 16A have not been operated, it is further determined whether or cot the (super) jump key of the function keys 16C has been operated (step S94) Here, In such a case in which the jump key has been operated, the CPU 11 proceeds to a processing of step S108, which will be described later, and when the jump key has not been operated, the CPU 11 proceeds to another processing.

Further, when the CPU 11 determines that the up and down keys of the cursor Keys 16D have been operated by the user, and the additional search key 16F has been operated in the list display of searched vocabulary entries at the step S89, which means that the user has selected a desired vocabulary entry from the list of vocabulary entries, and makes an attempt to further carry out search with the selected vocabulary entry, vocabulary entries from respective Japanese-language dictionaries which are the same as the selected vocabulary entry are list-displayed collectively and vertically on the display unit 17 by controlling of the CPU 11 (step S95). Then, thereafter, it is determined whether or not the up and down keys of the cursor keys 16D have been operated, and the decision key 165 has been further operated (step S96) Here, when operations other than such operations have been operated, the CPU 11 proceeds to another processing.

On the other hand, when the cursor keys 16D have been operated, and the decision key 16E has been further operated, explanatory information on the selected vocabulary entry is displayed full-screen on the display unit 17 (step S97). Then, thereafter, it is determined whether or not the character input keys 16A have been operated by the user (step S98). Here, when the character input keys 16A have been operated, the routine returns to the step S83. In contrast thereto, when the character input keys 16A have not been operated, it is further determined whether or not the (super) jump key of the function keys 16C has been operated (step S99). Here, in such a case in which the jump key has been operated, the CPU 11 proceeds to a processing of step S108, which will be described later, and when the jump key has not been operated, the CPU 11 proceeds to another processing.

Figure 14:
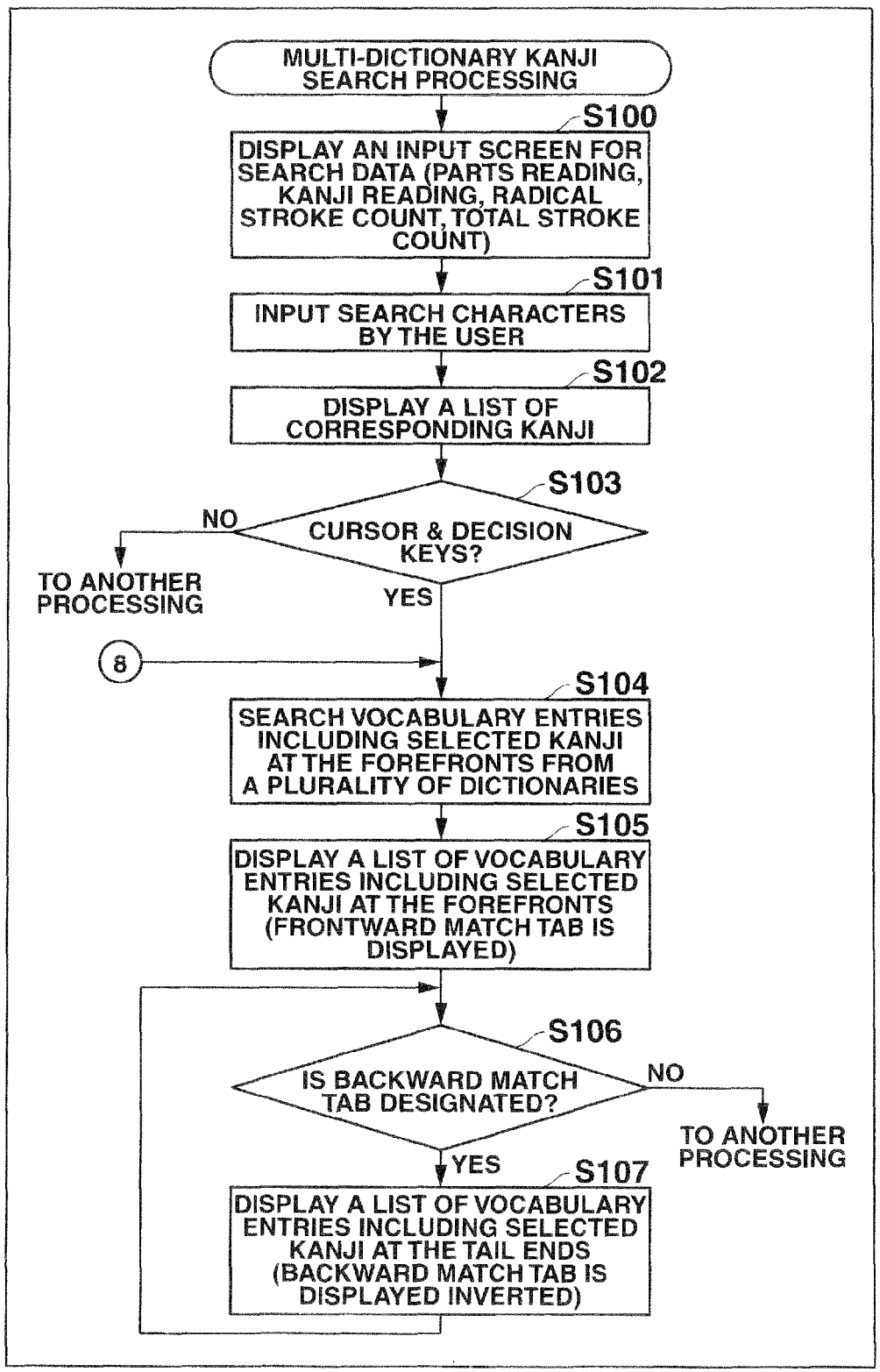
FIG. 14 is a diagram showing a flowchart for explanation of multi-dictionary Kanji search processing in the dictionary control program.

FIG. 14 is a diagram showing a flowchart for explanation of multi-dictionary Kanji search processing in the dictionary control program 12a.

Namely, when multi-Kanji search is designated by an operation of the dictionary selection keys 16B of the input unit 16, an input screen for search data (parts reading, radical stroke count, total stroke count, Kanji readings, search character string) is displayed on the display unit 17 (step S100).

Then, search data serving as a search term are inputted on the input screen by operations of the character input keys 16A by the user, and the inputted search data are stored in the search term data memory 12c of the memory 12 (step S101). Then, search from a designated dictionary in the dictionary data memory 12b of the memory 12 is carried out with the search data, and a list of searched Kanji is displayed on the display unit (step S102).

Thereafter, it is determined whether or not the cursor keys 16D have been operated, and the decision key 16E has been further operated by the user (step S103). Here, when operations other than such operations have been operated, the CPU 11 proceeds to another processing.

On the other hand, when the cursor keys 16D have been operated, and the decision key 16E has been further operated, vocabulary entries including the selected Kanji at the forefronts are searched from a plurality of dictionaries (step S104). Further, with respect to the processing at the step S104, when the CPU 11 proceeds to this processing in accordance with a user operation of the additional search key 16F in the above-described Kanji-Japanese dictionary search processing, vocabulary entries including the entry Kanji temporarily stored at the step S57 at the forefronts are searched from a plurality of dictionaries. Then, searched vocabulary entries Including the selected Kanji or the temporarily stored entry Kanji ("河" in the example of FIG. 6) at the forefronts are list-displayed as shown in FIG. 6 (step S105). Note that, at that time, the frontward match tab is displayed inverted.

Thereafter, it is determined whether or not the right key of the cursor keys 16D has been operated by the user (step S106). When such an operation of the cursor keys 16D has not been carried out, the CPU 11 proceeds to another processing In contrast thereto, when such an operation of the cursor keys 16D has been carried out, searched vocabulary entries including the selected Kanji or the temporarily stored entry Kanji ("河" in the example of FIG. 6) at the tail ends are list-displayed as shown in FIG. 6 (step S107). Note that, at that time, the frontward match tab is displayed inverted. Then, the routine returns to the step S106.

Figure 15:
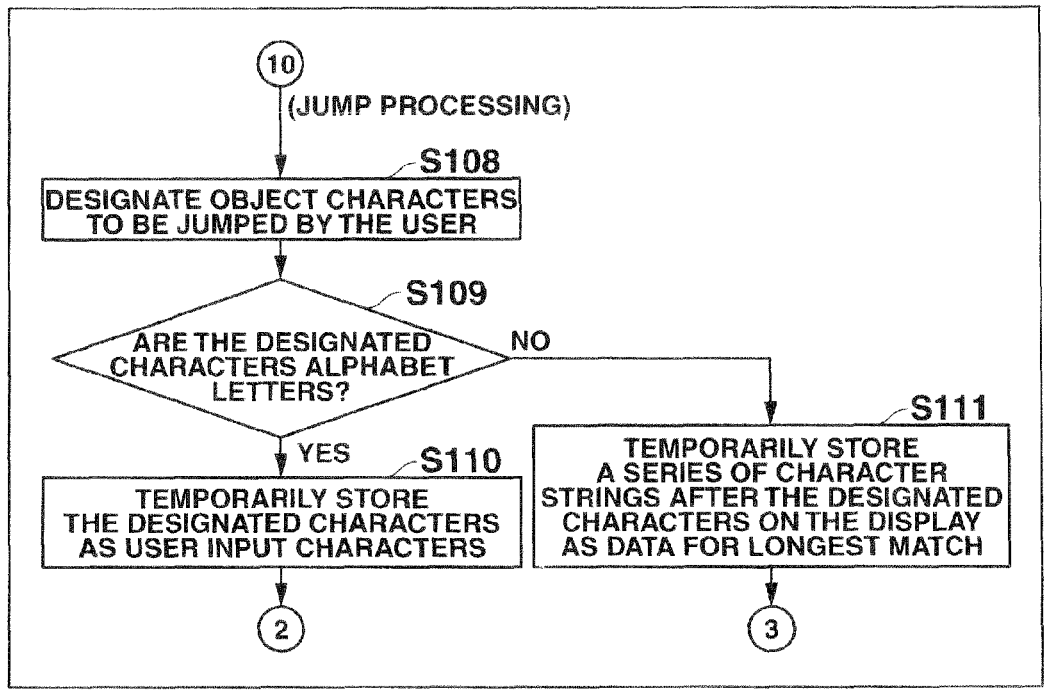
FIG. 15 is a diagram showing a flowchart for explanation of jump processing which is executed when it is determined that a jump key is operated at step S20, S28, S37, S48, S56, S68, S82, S94, or S99 in the dictionary control program.

FIG. 15 is a diagram showing a flowchart for explanation of jump processing which is executed when it is determined that the jump key has been operated at the step S20, S28, S37, 548, S56, S68, S81, S94, or S99.

Namely, first, object characters to be jumped are designated by operations of the up and down/left and right keys of the cursor keys 16D by the user, and the decision key 16E is operated (step S108). In accordance therewith. It is determined whether or not the designated characters are those of an alphabet (step S109).

Here, when the designated characters are those of an alphabet, the designated characters are temporarily stored as user input characters in the work area 12d of the memory 12 (step S110), and the CPU 11 proceeds to the processing of the step S73 in the above-described multi-ABC search processing. In accordance therewith, vocabulary entry search is executed from a first dictionary among a plurality of English-language dictionaries with the user input characters temporarily stored in the work area 12d.

Further, when it is determined that the designated characters are not those of an alphabet at the step S109, a series of character strings on the display after the designated characters are temporarily stored as data for longest match in the work area 12d of the memory 12 (step S111), and the CPU 11 proceeds to the processing of the step S85 in the above-described multi-Kana search processing. In accordance therewith, vocabulary entry search is executed from a first dictionary among a plurality of Japanese-language dictionaries with the data for longest match temporarily stored in the work area 12d. For example, as shown in FIG. 7, when "コ" of "ブリティッシュ・コロンビア" is designated as object characters to be jumped, vocabulary entry search is carried out from the "Japanese Dictionary" serving as a first dictionary, and vocabulary entries are list-displayed.

Figure 16:
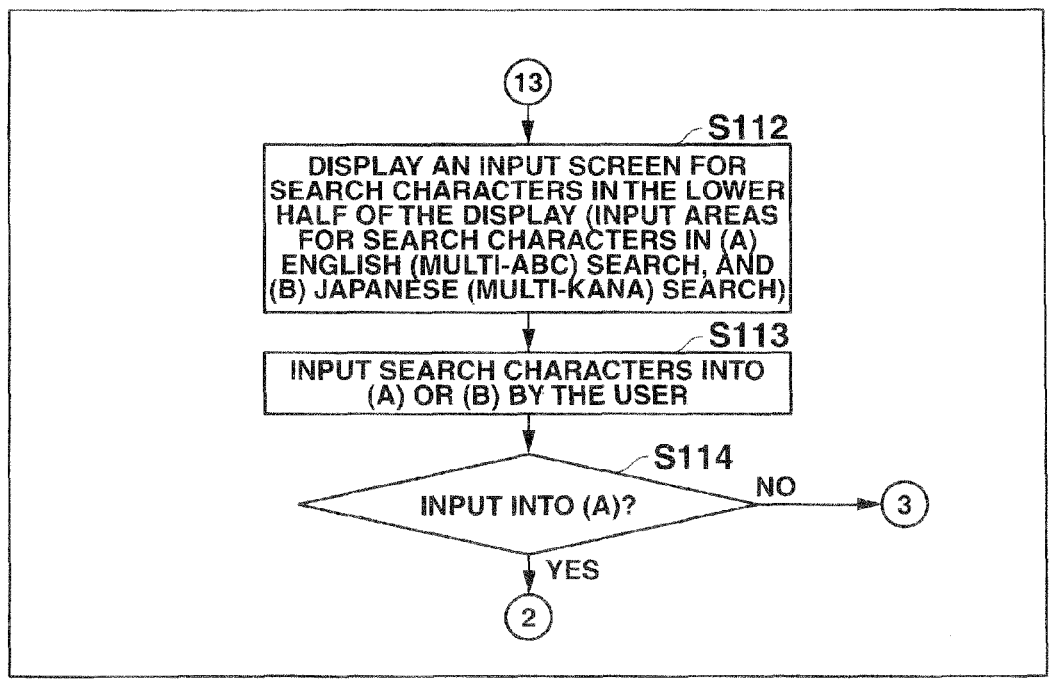
FIG. 16 is a diagram showing a flowchart for explanation of processing when it is determined that an additional search key is operated at step S18, S46, S80, or S92 in the dictionary control program.

FIG. 16 is a diagram showing a flowchart for explanation of processing of the CPU 11 when it determines that the additional search key 16F has been operated by the user at the step S18, S46, S80, or S92.

Namely, first, an input screen for search characters is displayed in the lower half on the display screen of the display unit 17 (step S112). This shows, as shown in FIG. 3, input areas for search characters in English (multi-ABC) search and Japanese (multi-Kana) search. Then, search characters serving as a search term are inputted on the input screen by operations of the character input keys 16A by the user, and the inputted search characters are temporarily stored in the work area 12d of the memory 12, and it is determined whether or not the input of the search characters is an input into an input area for search characters in English (multi-ABC) search (step S114).

Here, when that is an input into an input area for search characters in English (multi-ABC) search, the CPU 11 proceeds to the processing of the step S73. in accordance therewith, vocabulary entry search is executed from a first dictionary among a plurality of English-language dictionaries with the search characters temporarily stored in the work area 12d. Note that, in this case, the list of searched vocabulary entries displayed at the step S74 is, as shown in FIG. 3, to be displayed in the lower half of the display screen on the display unit 17. In the same way, the full-screen display on the display unit 17 of the explanatory information on the selected vocabulary entry at the step S79 means the display in the entire lower half of the display screen.

Further, when it is determined that it is not an input into an input area for search characters in English (multi-ABC) search, i.e., it is an input into an input area for search characters in Japanese (multi-Kana) search, the CPU 11 proceeds to the processing of the step S85. In accordance therewith, vocabulary entry search is executed from a first dictionary among a plurality of Japanese-language dictionaries with the search characters Temporarily stored in the work area 12d. Note that, in this case, the list of searched vocabulary entries displayed at the step S86 is displayed in the lower half of the display screen on the display unit 17. In the same way, the full-screen display on the display unit 17 of the explanatory information on the selected vocabulary entry at the step S91 means the display in the entire lower half of the display screen. Moreover, the collective and vertical list display of vocabulary entries from the respective Japanese-language dictionaries which are the same as the selected vocabulary entry at the step 595, and the full-screen display of the explanatory information on the selected vocabulary entry at the step S97 as well mean the displays in lower half on the display screen in the same way.

Note that, in a state in which display is carried out in the lower half on the display screen by carrying out one of the searches described above, and when the additional search key 16F is operated by the user again, as a display of the previous result of search which is displayed in the upper half is left, a new input screen for search characters is displayed as the display in the lower half by controlling the CPU 11. Or, the result of search displayed in the lower half of the display screen is moved to the displays On the upper half, and a new input screen for search characters nay be displayed as the display In the lower half.

The present invention has been described above on the basis of the embodiment. However, the invention of the application is not limited thereto, and the present invention can be modified in various ways within a range which does not deviate from the gist of the present invention. Moreover, inventions at various stages are included In the above-described embodiment, and various inventions can be extracted by appropriately combining a plurality of structural requirements to be disclosed. For example, even if some of the structural requirements are omitted from all of the structural requirements shown in the embodiment, or some of the structural requirements are combined, provided that the problems discussed in the "Summary of the Invention" section of the application can be solved and the effects described in the "Summary of the Invention" section of the application can be achieved, the structure in which the structural requirements have been omitted. or combined can be extracted to be the present invention.

What is claimed is:
1. An electronic dictionary apparatus comprising:
   a plurality of dictionary databases of different types;
   an additional search key;
   a display;
   example sentence search means for searching for example sentences including all of a plurality of search characters inputted by user operations from at least one of the plurality of dictionary databases, and for list-displaying searched respective example sentences on the display;
   list-display determination means for determining whether or not the additional search key is operated during the list display of the searched respective example sentences;
   search character input word order designation display means for displaying "&" at a tail of the plurality of inputted search characters and performing display for designating a search word order when it is determined that the additional search key is operated during the list display by the list-display determination means;
   search character word order example sentence display means for list-displaying example sentences on the display in accordance with inputted search characters and a designated word order when an additional search character is inputted and a word order is designated by user operations via the search character input word order designation display means;
   example sentence translation display means for displaying a translation of an entire example sentence selected in accordance with a decision operation by the user when it is determined that the additional search key is not operated during the list display by the list-display determination means;
   explanatory information search means for searching for a vocabulary entry corresponding to search characters inputted by the user operations from at least one of the plurality of dictionary databases, and for displaying explanatory information about the vocabulary entry on the display;
   explanatory display determination means for determining whether the additional search key is operated while the explanatory information about the vocabulary entry is displayed on the display by the explanatory information search means; and
   additional search means for continuing to display the explanatory information about the vocabulary entry on the display and for searching for another vocabulary entry when it is determined that the additional search key is operated while the explanatory information on the vocabulary entry is displayed on the display by the explanatory information search means.

2. The electronic dictionary apparatus according to claim 1, wherein the explanatory information search means comprises spelling check means for executing a spelling check on the search characters inputted by the user operations when the additional search key is operated at a time of searching for vocabulary entries corresponding to the search characters inputted by the user operations from the plurality of dictionary databases.

3. The electronic dictionary apparatus according to claim 2, further comprising:
Kanji search means for searching for Kanji candidates corresponding to search characters inputted by the user operations from a Kanji dictionary database which is one of the plurality of dictionary databases, for specifying a Kanji character which is desired by the user in accordance with an operation of selecting one Kanji candidate by the user, and for displaying explanatory information on the specified Kanji on the display; and
Kanji additional search means for searching for vocabulary entries including the specified Kanji character at a forefront or a tail end from the plurality of dictionary databases to be list-displayed on the display when the additional search key is operated while the explanatory information on the specified Kanji character is displayed on the display by the Kanji search means.

4. The electronic dictionary apparatus according to claim 3, further comprising:
multi-dictionary search means for searching for the vocabulary entries by switching the dictionary database from which the vocabulary entries including the search characters inputted by user operations are searched in accordance with the user operation, and for list-displaying the searched respective vocabulary entries from the dictionary database on the display; and
collective additional search means for searching for vocabulary entries which are the same as the selected vocabulary entry from the other plurality of dictionary databases, and for list-displaying the searched vocabulary entries which are the same as the selected vocabulary entry from the plurality of dictionary databases collectively on the display when the additional search key is operated in a state in which the user has selected one vocabulary entry in the list display of the respective vocabulary entries form one dictionary database searched by the multi-dictionary search means.

5. The electronic dictionary apparatus according to claim 4, wherein:
the example sentence search means searches for the example sentences by switching the dictionary database from which the example sentences including the search characters inputted by the user operations are searched in accordance with the user operation, and list-displays the searched respective example sentences from the dictionary database on the display.

6. The electronic dictionary apparatus according to claim 1, further comprising:
Kanji search means for searching for Kanji candidates corresponding to search characters inputted by the user operations from a Kanji dictionary database which is one of the plurality of dictionary databases, for specifying a Kanji character which is desired by the user in accordance with an operation of selecting one Kanji candidate by the user, and for displaying explanatory information on the specified Kanji on the display; and
Kanji additional search means for searching for vocabulary entries including the specified Kanji character at a forefront or a tail end from the plurality of dictionary databases to be list-displayed on the display when the additional search key is operated while the explanatory information on the specified Kanji character is displayed on the display by the Kanji search means.

7. The electronic dictionary apparatus according to claim 1, further comprising:
multi-dictionary search means for searching for the vocabulary entries by switching the dictionary database from which the vocabulary entries including the search characters inputted by user operations are searched in accordance with the user operation, and for list-displaying the searched respective vocabulary entries from the dictionary database on the display; and
collective additional search means for searching for vocabulary entries which are the same as the selected vocabulary entry from the other plurality of dictionary databases, and for list-displaying the searched vocabulary entries which are the same as the selected vocabulary entry from the plurality of dictionary databases collectively on the display when the additional search key is operated in a state in which the user has selected one vocabulary entry in the list display of the respective vocabulary entries form one dictionary database searched by the multi-dictionary search means.

8. The electronic dictionary apparatus according to claim 1, wherein:
the example sentence search means searches for the example sentences by switching the dictionary database from which the example sentences including the search characters inputted by the user operations are searched in accordance with the user operation, and list-displays the searched respective example sentences from the dictionary database on the display.

9. A dictionary search method comprising:
searching for example sentences including all of a plurality of search characters inputted by user operations from at least one of a plurality of dictionary databases;
list-displaying searched respective example sentences on a display;
determining whether or not an additional search key is operated during the list display of the searched respective example sentences;
displaying "&" at a tail of the plurality of inputted search characters and performing display for designating a search word order when it is determined that the additional search key is operated during the list display;
list-displaying example sentences on the display in accordance with inputted search characters and a designated word order when an additional search character is inputted and a word order is designated by user operations;
displaying a translation of an entire example sentence selected in accordance with a decision operation by the user when it is determined that the additional search key is not operated during the list display;
searching for a vocabulary entry corresponding to search characters inputted by the user operations from at least one of the plurality of dictionary databases;
displaying explanatory information about the vocabulary entry on the display;
determining whether the additional search key is operated while the explanatory information about the vocabulary entry is displayed on the display; and continuing to display the explanatory information about the vocabulary entry on the display and searching for another vocabulary entry when it is determined that the additional search key is operated while the explanatory information on the vocabulary entry is displayed on the display.

10. A non-transitory computer-readable recording medium having stored thereon a search control program for controlling an electronic dictionary apparatus comprising a plurality of dictionary databases of different types, an additional search key, and a display, wherein the search control program controls the electronic dictionary apparatus to perform functions comprising:

searching for example sentences including all of a plurality of search characters inputted by user operations from at least one of the plurality of dictionary databases;

list-displaying searched respective example sentences on the display;

determining whether or not the additional search key is operated during the list display of the searched respective example sentences;

displaying "&" at a tail of the plurality of inputted search characters and displaying a search designation of a word order when it is determined that the additional search key is operated during the list display;

list-displaying example sentences on the display in accordance with inputted search characters and a designated word order when inputting an additional search character and performing word order designation by a user operation;

displaying a translation of an entire example sentence selected in accordance with a decision operation by the user when it is determined that the additional search key is not operated during the list display;

searching for a vocabulary entry corresponding to search characters inputted by the user operations from at least one of the plurality of dictionary databases;

displaying explanatory information about the vocabulary entry on the display;

determining whether the additional search key is operated while the explanatory information about the vocabulary entry is displayed on the display; and continuing to display the explanatory information about the vocabulary entry on the display and searching for another vocabulary entry when it is determined that the additional search key is operated while the explanatory information on the vocabulary entry is displayed on the display.

* * * * *